(12) United States Patent
Enomoto et al.

(10) Patent No.: US 10,779,116 B2
(45) Date of Patent: Sep. 15, 2020

(54) COMMUNICATION TERMINAL, BASE STATION DEVICE, AND CONTROL DEVICE

(71) Applicant: SHARP KABUSHIKI KAISHA, Sakai, Osaka (JP)

(72) Inventors: Masayuki Enomoto, Sakai (JP); Masafumi Aramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/706,083

(22) Filed: Sep. 15, 2017

(65) Prior Publication Data

US 2018/0020327 A1    Jan. 18, 2018

Related U.S. Application Data

(63) Continuation of application No. 14/778,408, filed as application No. PCT/JP2014/057590 on Mar. 19, 2014, now abandoned.

(30) Foreign Application Priority Data

Mar. 21, 2013  (JP) .................................. 2013-058056

(51) Int. Cl.
*H04W 4/02* (2018.01)
*H04W 76/14* (2018.01)
(Continued)

(52) U.S. Cl.
CPC .............. *H04W 4/023* (2013.01); *H04W 4/80* (2018.02); *H04W 8/005* (2013.01); *H04W 64/00* (2013.01); *H04W 76/14* (2018.02); *H04W 84/12* (2013.01)

(58) Field of Classification Search
CPC ... H04W 4/023; H04W 64/00; H04W 76/023; H04W 4/008; H04W 8/005; H04W 84/12
(Continued)

(56) References Cited

U.S. PATENT DOCUMENTS

2007/0030824 A1* 2/2007 Ribaudo ................... G01S 5/02
370/328
2010/0008337 A1* 1/2010 Bajko ..................... H04W 64/00
370/338
(Continued)

FOREIGN PATENT DOCUMENTS

JP    2012-147155 A    8/2012
JP    2012-191443 A    10/2012
(Continued)

OTHER PUBLICATIONS

3GPP TR22.803 Technical Specification Group Services and System Aspects, Feasibility Study for Proximity Services (ProSe) V12.1.0 (Mar. 2013).
(Continued)

*Primary Examiner* — Congvan Tran
(74) *Attorney, Agent, or Firm* — Birch, Stewart, Kolasch & Birch, LLP

(57) ABSTRACT

In a proximity service, when positional information is notifies to a server in advance and the proximity service is started, UE that transmits and receives data receives the proximity degree including a communication target UE from the server before proximity discovery is performed to discover the communication target UE, and the UE controls unnecessary proximity discovery by discovering the communication target UE based on the proximity degree.

10 Claims, 25 Drawing Sheets

(51) Int. Cl.
*H04W 4/80* (2018.01)
*H04W 64/00* (2009.01)
*H04W 8/00* (2009.01)
*H04W 84/12* (2009.01)

(58) Field of Classification Search
USPC .................. 455/456.1, 456.3, 404.1, 404.2
See application file for complete search history.

(56) References Cited

U.S. PATENT DOCUMENTS

| | | | |
|---|---|---|---|
| 2010/0113001 A1* | 5/2010 | Tenbrook | H04W 4/021 455/422.1 |
| 2010/0169498 A1 | 7/2010 | Palanki et al. | |
| 2011/0228666 A1 | 9/2011 | Barbieri et al. | |
| 2011/0294474 A1 | 12/2011 | Barany et al. | |
| 2011/0310875 A1* | 12/2011 | Tysowski | H04W 48/16 370/338 |
| 2012/0011247 A1 | 1/2012 | Mallik et al. | |
| 2012/0179789 A1 | 7/2012 | Griot et al. | |
| 2012/0252498 A1* | 10/2012 | Trinchero | H04W 4/02 455/456.3 |
| 2013/0072229 A1 | 3/2013 | Schnurr | |
| 2013/0190015 A1 | 7/2013 | Hymel et al. | |
| 2013/0210393 A1* | 8/2013 | Hillier | H04W 4/021 455/413 |
| 2013/0343364 A1* | 12/2013 | Fuller | H04W 4/02 370/338 |
| 2014/0004796 A1* | 1/2014 | Cakulev | H04W 76/14 455/41.2 |
| 2014/0025758 A1 | 1/2014 | Glowacki | |
| 2014/0092885 A1* | 4/2014 | Venkatachalam | H04W 76/14 370/338 |
| 2014/0094122 A1* | 4/2014 | Etemad | H04W 76/14 455/41.2 |
| 2014/0094213 A1* | 4/2014 | Khoshnevis | H04W 52/383 455/522 |
| 2014/0134999 A1* | 5/2014 | Scheessele | H04W 76/02 455/426.1 |
| 2014/0155017 A1 | 6/2014 | Fan et al. | |
| 2014/0256365 A1* | 9/2014 | Schmidt | H04W 4/90 455/466 |
| 2015/0319579 A1* | 11/2015 | Syrjarinne | G01C 21/20 455/456.1 |
| 2018/0234866 A1* | 8/2018 | Johnsson | H04W 4/70 |

FOREIGN PATENT DOCUMENTS

| | | |
|---|---|---|
| WO | WO 2010/078273 A2 | 7/2010 |
| WO | WO 2011/116017 A1 | 9/2011 |
| WO | WO 2011/153269 A1 | 12/2011 |
| WO | WO 2012/006446 A1 | 1/2012 |
| WO | WO 2012/097075 A2 | 7/2012 |
| WO | WO 2012/144833 A2 | 10/2012 |

OTHER PUBLICATIONS

3GPP TS23.401 Technical Specification Group Services and System Aspects, General Packet Radio Service (GPRS) Enhancemtns for Evolved Universal Terrestrial Radio Access Network (E-UTRAN) Access V11.5.0. (Mar. 2013).

Final Office Action issued in co-pending U.S. Appl. No. 14/778,408, dated May 18, 2017.

Intel et al., "EPC support of ProSe communication over WLAN Possible architecture and required functionality," 3GPP Draft, S2-130324, Jan. 22, 2013, 33 pages, XP050684864.

Intel et al., "Solution for EPC Support for WLAN Direct Communications," 3GPP Draft, SA WG2 Temporary Document, SA WG2 Meeting #96, S2-131142, San Diego, CA, US, Apr. 8-12, 2013 (downloaded by EPO on Apr. 2, 2013), 6 pages, XP050708356.

Non-Final Office Action issued in co-pending U.S. Appl. No. 14/778,408, dated Aug. 1, 2016.

* cited by examiner

FIG. 2
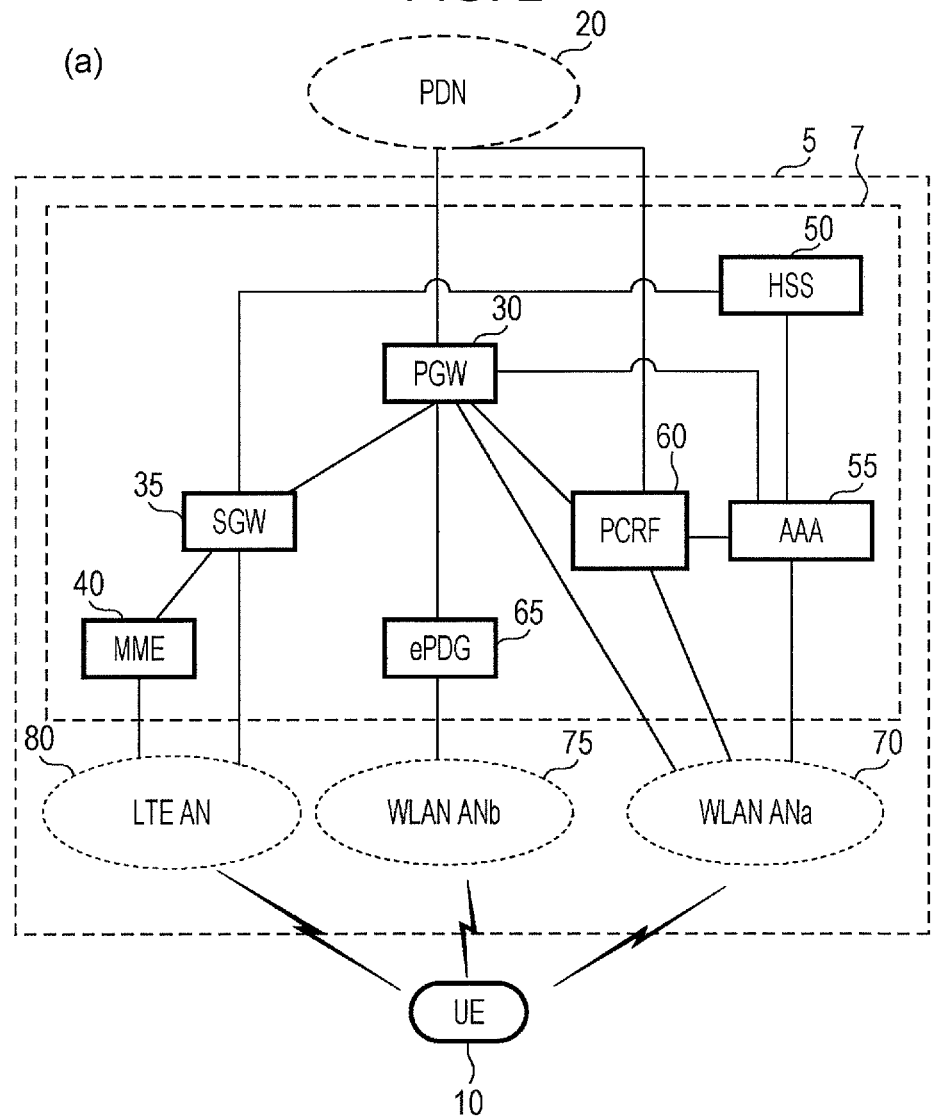
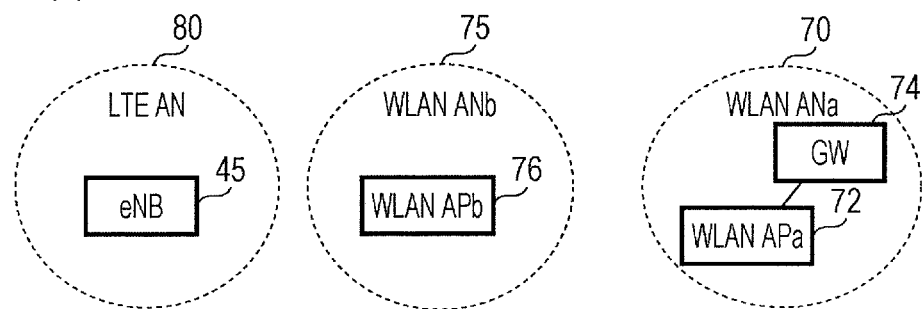

FIG. 4
(a)
| APP1 | Cat. 1 |
|------|--------|
| APP2 | Cat. 2 |
| APP3 | Cat. 3 |
| Cat. 1 | LTE(D) |
|--------|--------|
| Cat. 2 | WLAN(D) |
| Cat. 3 | LTE(D), WLAN(D) |
(b)
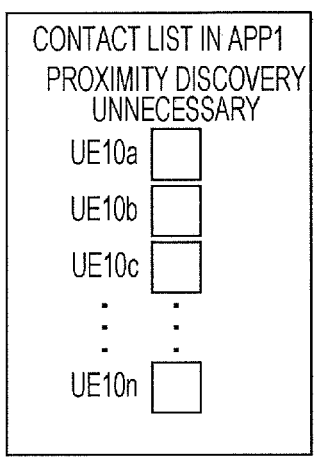
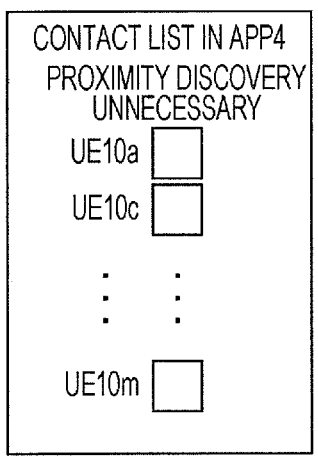
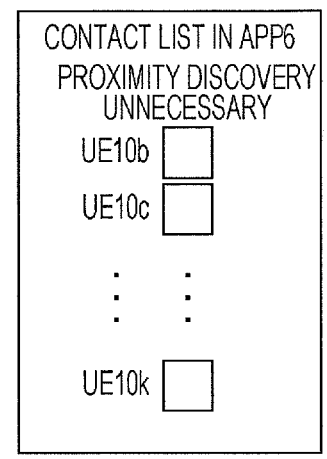

| UE IDENTIFIER | POSITION IDENTIFIER |
|---|---|
| UE10 | POSITION A |
| | POSITION a |
| UE10a | POSITION A |
| | POSITION b |
| UE10b | POSITION B |
| UE10c | POSITION C |
| ... | ... |
| UE10zz | POSITION x |

(b)

| DETERMINATION METHOD | DETERMINATION RESULT |
|---|---|
| CASE WHERE UEs ARE LOCATED IN BASE STATIONS HAVING THE SAME AP NAME | WLAN(D) |
| CASE WHERE UEs ARE LOCATED IN BASE STATIONS HAVING THE SAME SSID | WLAN(D) |
| CASE WHERE UEs ARE LOCATED IN THE SAME Realm | WLAN(D) |
| CASE WHERE UEs ARE LOCATED IN THE SAME eNB | LTE(D) |
| THERE IS NOT ANY CORRESPONDENCE CASE | none |

FIG. 9
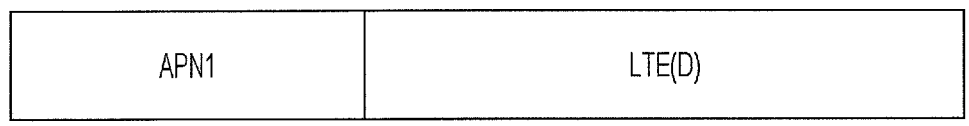
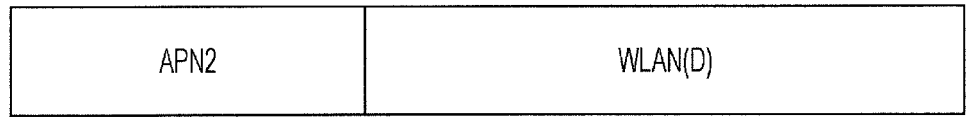

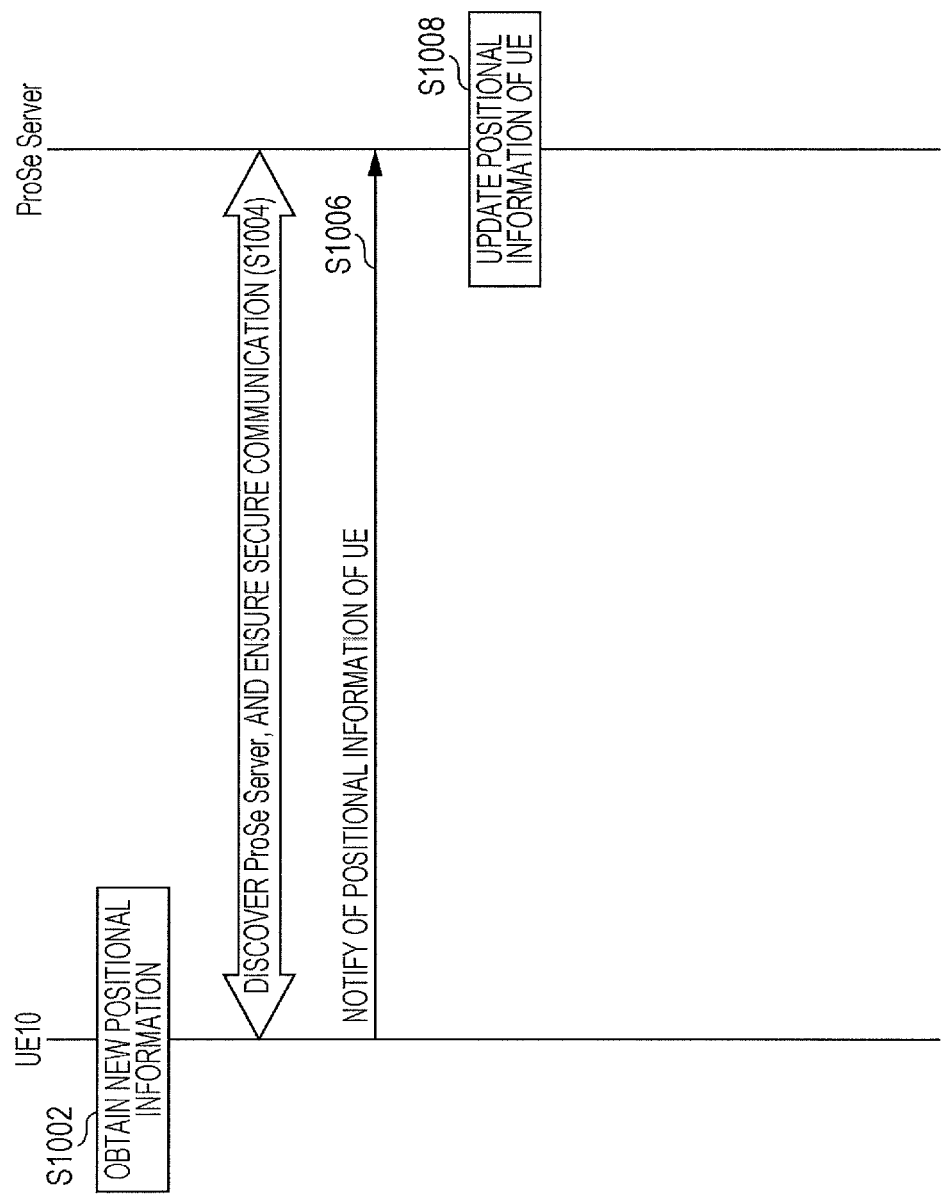

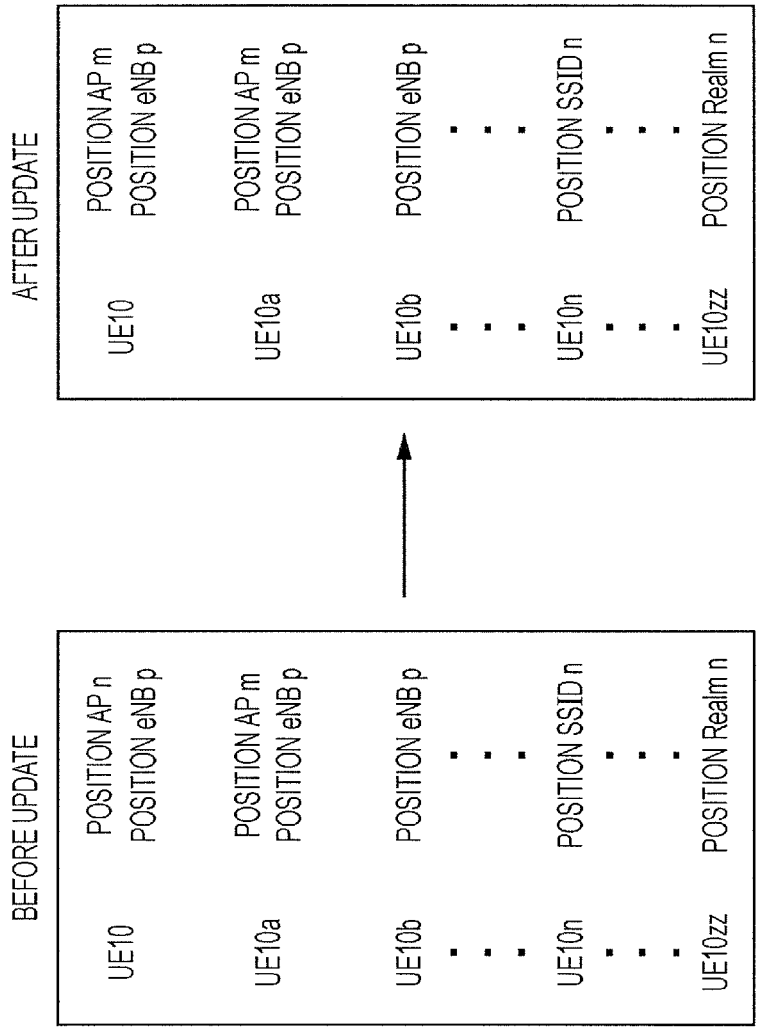

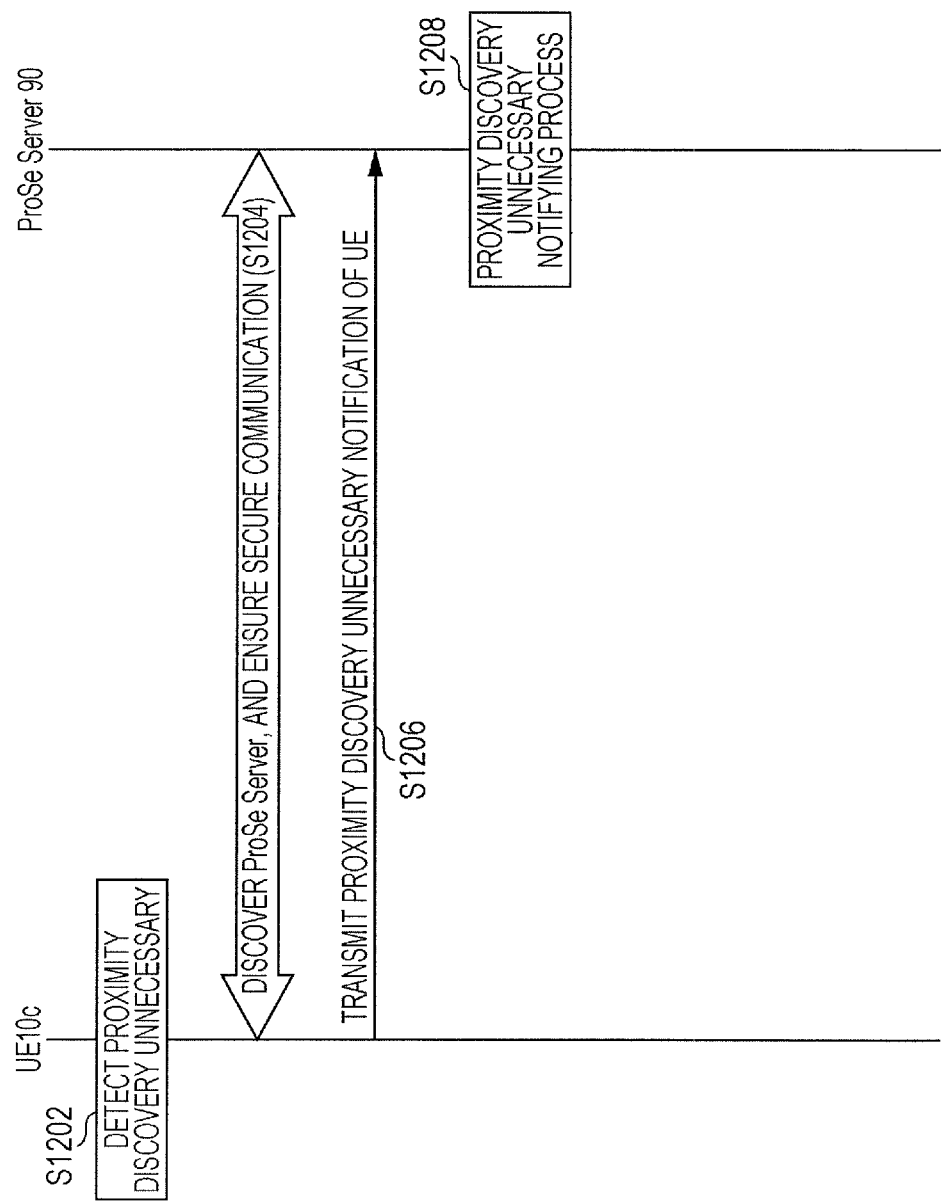

FIG. 13

CASE WHERE UE10c TRANSMITS PROXIMITY DISCOVERY
UNNECESSARY NOTIFICATION TO ProSe Server

BEFORE UPDATE

CONTACT LIST IN APP1

CONTACT LIST OF UE10
PROXIMITY DISCOVERY
UNNECESSARY
UE10a ☐
UE10b ☐
UE10c ☐
⋮  ⋮
UE10n ☐

CONTACT LIST IN APP3

CONTACT LIST OF UE10
PROXIMITY DISCOVERY
UNNECESSARY
UE10b ☐
UE10c ☐
⋮  ⋮
UE10n ☐

···

AFTER UPDATE

CONTACT LIST IN APP1

CONTACT LIST OF UE10
PROXIMITY DISCOVERY
UNNECESSARY
UE10a ☐
UE10b ☐
UE10c 
⋮  ⋮
UE10n ☐

CONTACT LIST IN APP3

CONTACT LIST OF UE10
PROXIMITY DISCOVERY
UNNECESSARY
UE10b ☐
UE10c ☐
⋮  ⋮
UE10n ☐

···

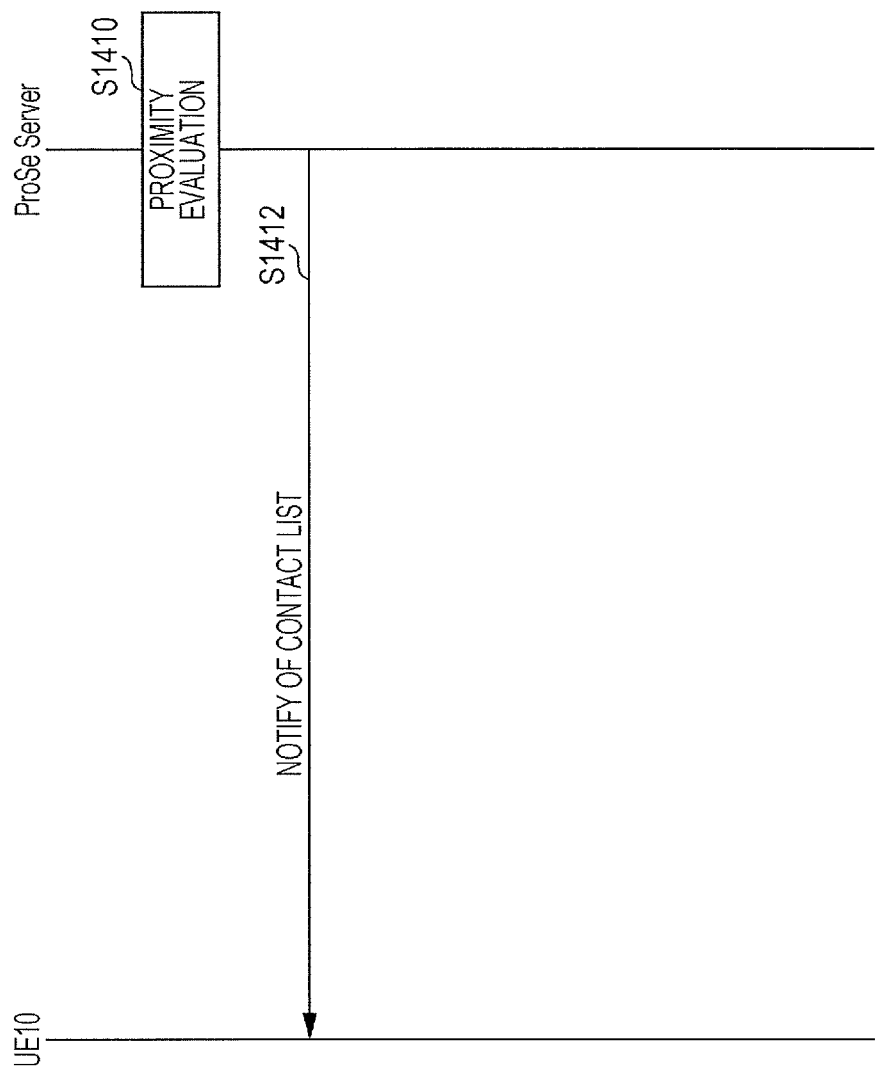

| CONTACT LIST OF UE10 | USABLE COMMUNICATION PATH |
|---|---|
| UE10a | LTE(D) |
| UE10b | LTE(D) |
| ⋮ | ⋮ |
| UEn | none |

(b)

| CONTACT LIST OF UE10 | USABLE COMMUNICATION PATH |
|---|---|
| UE10a | WLAN(D) |
| ⋮ | ⋮ |
| UEm | none |

(c)

| CONTACT LIST OF UE10 | USABLE COMMUNICATION PATH |
|---|---|
| UE10a | LTE(D), WLAN(D) |
| UE10b | LTE(D) |
| UE10d | WLAN(D) |
| ⋮ | ⋮ |
| UEk | none |

| ON/OFF OF LTE(D) | ON |
|---|---|

(b)

| ON/OFF OF WLAN(D) | ON |
|---|---|

FIG. 23

CONTACT LIST IN APP1

| CONTACT LIST OF UE10 | PROXIMITY DISCOVERY UNNECESSARY | LTE(D) | WLAN(D) |
|---|---|---|---|
| UE10a | ☐ | ON | ON |
| UE10b | ☐ | ON | OFF |
| UE10c | ✓ | ON | OFF |
| ⋮ | ⋮ | ⋮ | ⋮ |
| UE10n | ☐ | ON | OFF |

CASE WHERE UE10b TRANSMITS OFF OF LTE(D)

BEFORE UPDATE

CONTACT LIST IN APP1

| CONTACT LIST OF UE10 | PROXIMITY DISCOVERY UNNECESSARY | LTE(D) | WLAN(D) |
|---|---|---|---|
| UE10a | ☐ | ON | ON |
| UE10b | ☐ | ON | OFF |
| UE10c | ✓ | ON | OFF |
| ⋮ | ⋮ | ⋮ | ⋮ |
| UE10n | ☐ | ON | OFF |

AFTER UPDATE

CONTACT LIST IN APP1

| CONTACT LIST OF UE10 | PROXIMITY DISCOVERY UNNECESSARY | LTE(D) | WLAN(D) |
|---|---|---|---|
| UE10a | ☐ | ON | ON |
| UE10b | ☐ | OFF | OFF |
| UE10c | ✓ | ON | OFF |
| ⋮ | ⋮ | ⋮ | ⋮ |
| UE10n | ☐ | ON | OFF |

FIG. 25

| UE ACTION POLICY | WLAN(D) IS PERFORMED IN CASE OF PROXIMITY DEGREES OF 1 TO 3, LTE(D) IS PERFORMED IN CASE OF PROXIMITY DEGREE OF PROXIMITY 4, AND DIRECT COMMUNICATION IS NOT AVAILABLE IN CASE OF PROXIMITY DEGREE OF PROXIMITY 5 |
|---|---|

FIG. 26

| CONTENT OF POLICY | PROXIMITY DEGREE |
|---|---|
| CASE WHERE UEs ARE LOCATED IN THE SAME AP NAME | 1 |
| CASE WHERE UEs ARE LOCATED IN THE SAME SSID | 2 |
| CASE WHERE UEs ARE LOCATED IN THE SAME Realm | 3 |
| CASE WHERE UEs ARE LOCATED IN THE SAME eNB | 4 |
| THERE IS NOT ANY CORRESPONDENCE CASE | 5 |

FIG. 27

| CONTACT LIST OF UE10 | DEGREE OF PROXIMITY |
|---|---|
| UE10a | 1 |
|  | 4 |
| UE10b | 4 |
| ⋮ | ⋮ |
| UEzz | 5 |

COMMUNICATION TERMINAL, BASE STATION DEVICE, AND CONTROL DEVICE

CROSS-REFERENCE TO RELATED APPLICATIONS

This application is a Continuation of application Ser. No. 14/778,408, filed on Sep. 18, 2015, which is a U.S. National Phase filing of International Application No. PCT/JP2014/057590, filed on Mar. 19, 2014, which claims benefit under 35 U.S.C. § 119(a) to Application No. 2013-058056, filed in Japan on Sep. 15, 2013, all of which are hereby expressly incorporated by reference into the present application.

TECHNICAL FIELD

The present invention relates to a mobile communication system that includes a communication terminal, a base station device, a control device, a proximity terminal which is positioned in the proximity of the communication terminal, and a server device which detects the proximity terminal.

This application is based upon and claims the benefit of priority of the prior Japanese Patent Application No. 2013-058056, filed on Mar. 21, 2013, the entire contents of which are incorporated herein by reference.

BACKGROUND ART

In the 3GPP (the 3rd Generation Partnership Project) which is the standardization group for a mobile communication system, the specification work of EPS (Evolved Packet System) described in Non Patent Literature 1 as the next generation mobile communication system has proceeded, a wireless LAN (WLAN) as well as LTE (Long Term Evolution) as an access system connected to the EPS has been examined.

In the 3GPP, as described in Non Patent Literature 2, proximity services (ProSe) that notify user equipment (UE) of the presence of other user equipment in proximity have been examined. In the ProSe, the UE can directly transmit and receive data to and from the proximity UE without a base station.

In the ProSe, since the data is directly transmitted and received between the UEs, a mobile communication network or a wireless LAN network is not used, and data traffic can be offloaded. Thus, it is possible to avoid the concentration of traffic in the LTE.

In the ProSe, the use of two methods as a direct communication path between the UEs has been examined. The first method is a method (hereinafter, referred to as LTE Direct) of establishing the direct communication path between the UEs using an LTE access technology, and the second method is a method of establishing the direct communication path using a wireless LAN access technology.

In the LTE Direct, the UE uses a commercial frequency allocated in an LTE system of each mobile communication provider, and directly transmits and receives data to and from the another UE by using an LTE communication system.

In the WLAN Direct, the UE uses a non-commercial frequency allocated in the WLAN, and directly transmits and receives data to and from the another UE.

In the ProSe, the necessity for the UE to detect the presence of the communication target UE in proximity by discovering a communication target UE in order to transmit and receive data through the LTE Direct or the WLAN Direct is given as a service required condition.

In order to provide a service by the mobile communication provider, direct communication between the UEs is defined as being required for an approval of the mobile communication provider at the time of establishing the direct communication path between the UEs.

As stated above, an object of the ProSe is to provide a service that notifies a certain UE of the presence of the proximity UE, and a service that provides communication through the direct communication path between the UEs.

CITATION LIST

Non Patent Literature

NPL 1: 3GPP TS23.401 Technical Specification Group Services and System Aspects, General Packet Radio Service (GPRS) enhancements for Evolved Universal Terrestrial Radio Access Network (E-UTRAN) access.

NPL 2: 3GPP TR22.803 Technical Specification Group Services and System Aspects, Feasibility study for Proximity Services (ProSe).

SUMMARY OF INVENTION

Technical Problem

However, since there is no means for realizing a notification method of the proximity terminal and an establishment method of the direct communication path between the UEs, the UE starts the discovery at random when the UE as a communication source discovers the UE as the communication target irrespective of whether or not the communication target UE is in proximity. When the communication target UE is not in proximity, the communication target UE is not discovered, and the communication source UE wastes power consumption.

When the UE starts the transmission and reception of data through the ProSe, even though the communication target UE is in the proximity of the communication source UE, if the communication source UE requests the transmission and reception of data through the LTE Direct and the communication target UE is not able to perform the transmission and reception of data through the LTE Direct, unnecessary discovery is started, and thus, the communication source UE wastes the power consumption.

When the UE starts the transmission and reception of data through the ProSe, even though the communication target UE is in the proximity of the communication source UE, if the communication source UE requests the transmission and reception of data through the WLAN Direct and the communication target UE is not able to perform the transmission and reception of data through the WLAN Direct, the unnecessary discovery is started, and thus, the communication source UE wastes the power consumption.

Since the mobile communication provider has no means for granting permission or non-permission for the establishment of the direct communication path of the UE, the mobile communication provider is not able to provide a proximity communication service to a user.

The present invention has been made in view of the above circumstances, and it is an object of the present invention to provide a mobile communication system in which a communication source UE efficiently discovers a communication target UE and performs notification and a mobile communication provider provides direct communication between the UEs to the UEs when data is transmitted and received in ProSe.

Solution to Problem

According to an aspect of the present invention, there is provided a communication terminal of a mobile communication system that includes a server device which detects a proximity terminal, a control device, a terminal device, and a proximity terminal device which is positioned in the proximity of the terminal device. The communication terminal is adapted to: obtain information regarding the proximity terminal device positioned at a distance capable of performing the establishment of a direct communication path correlated with an application, and information regarding a direct communication path capable of being established from the server device; transmit a request message which requests an approval for the establishment of the direct communication path capable of being established to the control device; receive a response message indicating that the establishment of the direct communication path capable of being established is permitted; and establish the direct communication path with the proximity terminal device based on the response message.

The communication terminal may be adapted to: retain a first APN which permits the establishment of the direct communication path, and a second APN which does not permit the establishment of the direct communication path; and transmit the request message which requests the approval for the establishment of the direct communication path capable of being established to the control device by adding an APN which permits the establishment of the direct communication path to the request message.

The communication terminal may be adapted to: transmit a request message which requests the establishment of a communication path to a control station by adding an APN which does not permit the establishment of a direct communication path to the request message; receive a response message indicating that the establishment of the communication path is permitted and the communication path is established from a control device; establish the communication path based on the response message; manage an application and a communication path in correlation with each other, and select the direct communication path or the communication path to transmit application data using the selected communication path based on the correlation of the application with the communication path.

According to another aspect of the present invention, there is provided a control device of a mobile communication system that includes a server device which detects a proximity terminal, the control device, a terminal device, and a proximity terminal device which is positioned in the proximity of the terminal device. The control device is adapted to: manage identification information of the terminal device and permission information for the establishment of a direct communication path in correlation with each other, receive a request message which requests an approval for the establishment of the direct communication path which is transmitted from the terminal device; and permit the establishment of the direct communication path of the terminal device based on the correlation of the identification information of the terminal device with the permission information for the establishment of the direct communication path.

According to still another aspect of the present invention, there is provided a base station device of a mobile communication system that includes a server device which detects a proximity terminal, a control device, a terminal device, and the base station device. The base station device is adapted to: receive a notification including information indicating whether or not the establishment of a direct communication path of the terminal device is permitted from the control device; and allocate a radio resource for transmitting and receiving data to and from the terminal device based on the permission information included in the notification.

ADVANTAGEOUS EFFECTS OF INVENTION

According to the aspect of the present invention, when the communication source UE performs the transmission and reception of data in the ProSe, it is possible to prevent the power consumption of the communication source UE from being inefficiently consumed by discovering the communication target UE without unnecessarily discovering the communication target UE.

It is possible to discover the communication target UE by giving the condition for discovering the communication target UE to the communication source UE, and it is possible to realize the start of the transmission and reception of data in the ProSe.

The mobile communication provider determines whether or not to permit the establishment of the direct communication path of the UEs, and thus, it is possible to provide the direct communication between the UEs to the UEs.

BRIEF DESCRIPTION OF DRAWINGS

FIG. 2 is a diagram for describing the configuration of an IP mobile communication network.

FIG. 4 is a diagram showing an example of the functional configuration managed in a storage unit of the UE.

FIG. 7 is a diagram showing an example of a proximity evaluation policy and a positional information management table.

FIG. 9 is a diagram for describing permission information for the establishment of a communication path.

FIG. 10 is a diagram for describing a position notification procedure according to the first embodiment.

FIG. 11 is a diagram showing a case where positional information in the ProSe Server is updated.

FIG. 12 is a diagram for describing a proximity detection unnecessary procedure according to the first embodiment.

FIG. 13 is a diagram showing a case where the Server contact list based on the proximity detection unnecessary procedure is updated.

FIG. 14 is a diagram for describing a proximity detection procedure according to the first embodiment.

FIG. 16 is a diagram showing an example of proximity detection according to the first embodiment.

FIG. 22 is a diagram showing an LTE(D) availability management table and a WLAN(D) availability management table managed in the UE.

FIG. 23 is a diagram showing a Server contact list including LTE(D) availability and WLAN(D) availability in the ProSe Server.

FIG. 25 is a diagram showing an example of a UE action policy in the UE.

FIG. 26 is a diagram showing an example of a proximity evaluation policy in the ProSe Server.

FIG. 27 is a diagram showing an example of the proximity detection.

DESCRIPTION OF EMBODIMENTS

Hereinafter, embodiments for implementing the present invention will be described with reference to the drawings. For example, in the present embodiment, embodiments of a mobile communication system when the present invention is applied will be described in detail with reference to the drawings.

Hereinafter, LTE Direct is referred to as LTE(D), and WLAN Direct is referred to as WLAN(D). Here, the LTE(D) implies that a direct communication path is established between UEs by using an LTE communication method, and the WLAN(D) implies that a direct communication path is established between the UEs by using a WLAN communication method.

1. First Embodiment

First, a first embodiment to which the present invention is applied will be described with reference to the drawings.

1.1 Outline of Mobile Communication System

Figure 1:
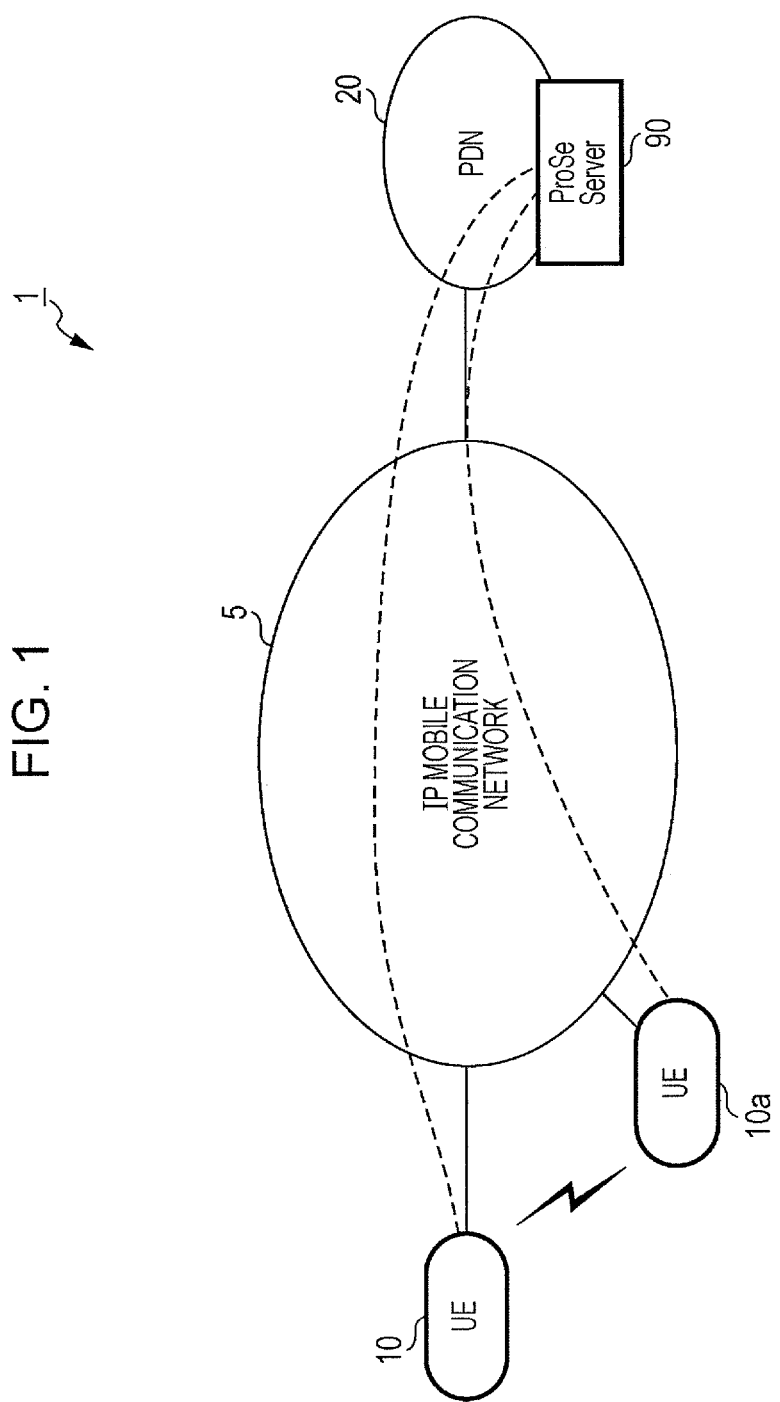
FIG. 1 is a diagram for describing the outline of a mobile communication system 1 according to a first embodiment.

FIG. 1 is a diagram for describing the outline of a mobile communication system 1 according to the present embodiment. As shown in this drawing, the mobile communication system 1 includes the UE (mobile station device) 10, the UE (mobile station device) 10a, and a PDN (Packet Data Network) 20, which are connected via an IP mobile communication network 5.

A ProSe Server 90 is provided in the PDN 20. The ProSe Server 90 may be provided in any position of the PDN 20. The UE 10 and the UE 10a ensure secure communication with the ProSe Server 90, and thus, the ProSe Server 90 can transmit and receive control information or data.

The UE 10 and the UE 10a are in proximity to each other, and are positioned in places where the UEs can discover each other in proximity discovery for starting the transmission and reception of data through ProSe.

For example, the IP mobile communication network 5 may be a network which includes a core network and a wireless access network operated by a mobile communication provider, or may be a broadband network operated by a fixed-line communication provider. The IP mobile communication network operated by the mobile communication provider will be described below in detail.

The broadband network refers to an IP communication network operated by a communication provider that is connected through ADSL (Asymmetric Digital Subscriber Line) and provides high-speed communication using a digital line such as an optical fiber. The broadband network is not limited to the above example, but may be a network that allows for wireless access using WiMAX (Worldwide Interoperability for Microwave Access).

The UE 10 is a communication terminal that is connected using an access system such as LTE or WLAN, and can be connected to the IP network by being connected using a built 3GPP LTE communication interface or WLAN communication interface. As a specific example, the UE is a portable telephone terminal or a smartphone, or the UE is a household electrical appliance, a tablet computer, or a personal computer, which has a communication function.

The PDN 20 refers to a network that provides a network service for transmitting and receiving data in packets, and is, for example, the internet or an IMS.

The PDN 20 is connected to the IP access network by using a wired line. For example, the PDN is established by ADSL (Asymmetric Digital Subscriber Line) or an optical fiber. The PDN is not limited to the above example, but may be a wireless access network such as LTE (Long Term Evolution), WLAN (Wireless LAN), or WiMAX (Worldwide Interoperability for Microwave Access).

[1.1.1 Configuration Example of IP Mobile Communication Network]

As shown in FIG. 2, the mobile communication system 1 includes the UE 10, the IP mobile communication network 5, and the PDN 20 (Packet Data Network). The UE 10a is a UE different from the UE 10 and has the same configuration as that of the UE 10, and thus, the description thereof will be omitted.

In addition to the UE 10 or the UE 10a, a plurality of UEs may be connected to the IP mobile communication network 5, but will be omitted for the sake of simplification in the drawings. The IP mobile communication network 5 includes a core network 7 and the respective wireless access networks. The detailed configuration of the core network 7 is illustrated in (a) of FIG. 2.

The PDN 20 is a network that provides a network service for transmitting and receiving data in packets as described in FIG. 1, and is, for example, the Internet or an IMS.

The core network 7 includes a PGW (access control device) 30 (Packet Data Network Gateway), a SGW 35 (Serving Gateway), a MME 40 (Mobile Management Entity), a HSS 50 (Home Subscriber Server), an AAA 55 (Authentication, Authorization, and Accounting), a PCRF 60 (Policy and Charging Rules Function), and an ePDG 65 (enhanced Packet Data Gateway).

The wireless access network may include a plurality of different access networks. The respective access networks are connected to the core network 7. The UE 10 can be wirelessly connected to the wireless access network.

The wireless access network may be implemented using an LTE access network (LTE AN 80) that can be connected in an LTE access system, or an access network that can be connected in a WLAN access system.

The access network that can be connected in the WLAN access system may include a WLAN access network b (WLAN ANb 75) that is connected using the ePDG 65 as a connection device to the core network 7, and a WLAN access network a (WLAN ANa 70) that is connected to the PGW 30, the PCRF 60 and the AAA 55.

The devices have the same configurations as those of the devices of the related art in the mobile communication system using an EPS, and thus, the detailed description thereof will be omitted, but the functions thereof will be briefly described. The PGW 30 is connected to the PDN 20, the SGW 35, the ePDG 65, the WLAN ANa, the PCRF 60 and the AAA 55, and serves as a gateway device between the core network 7 and the PDN 20 to deliver user data.

The SGW 35 is connected to the PGW 30, the MME 40, and the LTE AN 80, and serves as a gateway device between the LTE AN 80 and the core network 7 to deliver user data.

The MME 40 is connected to the SGW 35 and the LTE AN 80, and is an access control device that performs access control of the UE 10 via the LTE AN 80.

The HSS 50 is connected to the SGW 35 and the AAA 55, and manages subscriber information. The AAA 55 is connected to the PGW 30, the HSS 50, the PCRF 60 and the WLAN ANa 70, and performs access control of the UE 10 which is connected via the WLAN ANa 70. The PCRF 60 is connected to the PGW 30, the WLAN ANa 70 and the AAA 55, and manages QoS for the delivery of user data.

The ePDG 65 is connected to the PGW 30 and the WLAN ANb 75, and serves as a gateway device between the core network 7 and the WLAN ANb 75 to deliver user data.

As shown in (b) of FIG. 2, each of the wireless access networks includes a device (for example, base station device or access point device) to which the UE 10 is actually connected. Although various devices compliant with the wireless access networks are considered as a device used for connection, the LTE AN 80 includes the eNB 45 in the present embodiment. The eNB 45 is a wireless base station to which the UE 10 is connected in the LTE access system, and the LTE AN 80 may include one wireless base station or a plurality of wireless base stations.

The WLAN ANa 70 includes a WLAN APa 72, and a GW 74 (Gateway). The WLAN AP 72 is a wireless base station to which the UE 10 is connected in the WLAN access system, and the WLAN AN 70 may include one wireless base station or a plurality of wireless base stations.

The GW 74 is a gateway device between the core network 7 and the WLAN ANa 70. The WLAN APa 72 and the GW 74 may be implemented by a single device.

As stated above, the gateway included in the WLAN ANa 70 can be connected to the plurality of devices within the core network 7. When the provider that operates the core network 7 and the provider that operates the WLAN ANa 70 are different from each other, such a configuration may be operated when a trust relationship is established by an operational contract or agreement between the providers. In other words, the WLAN APa 72 is an access network having reliability for the provider that operates the core network 7.

The WLAN ANb 75 includes a WLAN APb 76. The WLAN AP 76 is a wireless base station to which the UE 10 is connected in the WLAN access system, and the WLAN AN 75 includes one wireless base station or a plurality of wireless base stations.

As mentioned above, the WLAN ANb 75 is connected to the core network 7 by using the ePDG 65 which is the device included in the core network 7 as a gateway. The ePDG 65 has a security function for ensuring safety.

When the provider that operates the core network 7 and the provider that operates the WLAN ANa 70 are different from each other, such a configuration is operated when a trust relationship is not established by an operational contract or agreement between the providers.

In other words, the WLAN APa is an access network that does not have reliability for the provider that operates the core network 7, and provides safety in the ePDG 65 included in the core network 7.

In the present specifications, the UE 10 being connected to the respective wireless access networks means that the UE is connected to the base station devices or the access points included in the respective wireless access networks, and data or signal to be transmitted and received passes through the base station device or the access point.

For example, the UE 10 being connected to the LTE AN 80 means that the UE 10 is connected via the eNB 45, and the UE being connected to the WLAN ANa 70 means that the UE is connected via the WLAN APa 72 and/or the GW 74. The UE 10 being connected to the WLAN ANb 75 means that the UE 10 is connected to the WLAN APb 76.

1.2 Device Configuration

Next, the configurations of the respective devices will be simply described with reference to the drawings.

[1.2.1 Configuration of UE]

Figure 3:
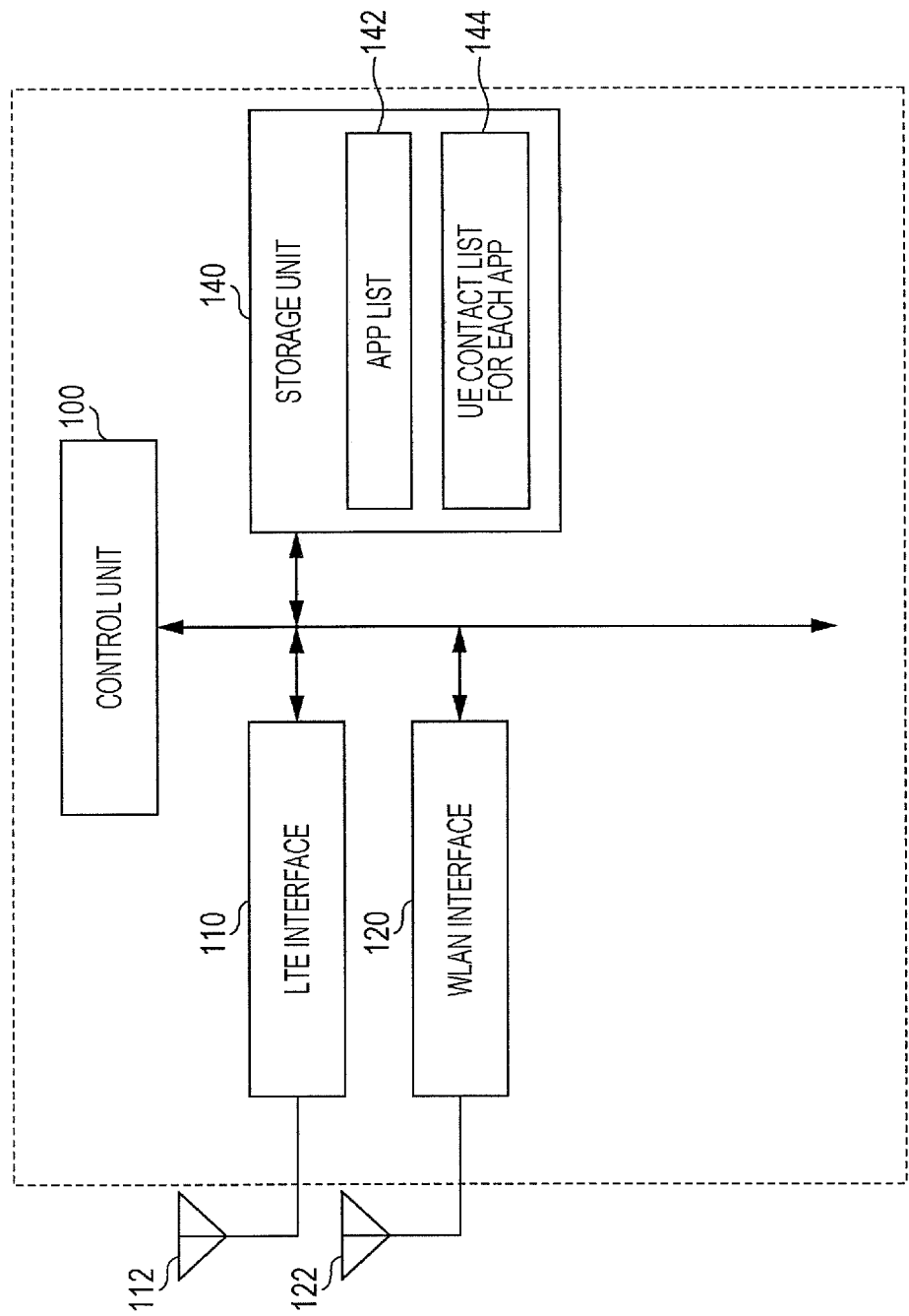
FIG. 3 is a diagram for describing the functional configuration of a UE according to the first embodiment.

FIG. 3 shows the functional configuration of the UE 10 according to the present embodiment. In the UE 10, an LTE interface 110, a WLAN interface 120 and a storage unit 140 are connected to a control unit 100 through a bus.

The control unit 100 is a functional unit for controlling the UE 10. The control unit 100 realizes various processes by reading various programs stored in the storage unit 140 and executing the read program.

The LTE interface 110 is a functional unit that transmits and receives data through wireless communication by using an LTE access method. An external antenna 112 is connected to the LTE interface 110.

The UE 10 may perform communication by being connected to an LTE base station through the LTE interface and being connected to the IP access network 5, or may perform communication by establishing a direct communication path with another UE without using the LTE base station.

The WLAN interface 120 is a functional unit that transmits and receives data through wireless communication by using a wireless LAN access method. An external antenna 122 is connected to the WLAN interface 120.

The UE 10 may perform communication by being connected to a WLAN base station through a WLAN interface and being connected to the IP access network 5, or may perform communication by establishing a direct communication path with another UE without using the WLAN base station.

The storage unit 140 is a functional unit that stores programs and data required for various operations of the UE 10. For example, the storage unit 140 is a semiconductor memory or a hard disk drive (HDD). An APP list 142 is stored in the storage unit 140.

Applications that can be used by the UE 10 are stored in the APP list 142. (a) of FIG. 4 is a diagram showing an example of the APP list 142. In the APP list 142 of (a) of FIG. 4, the applications that can be used by the UE 10 are represented as APP 1 to APP 3.

The application may be managed by being distinguished from a different application according to data classification such as VoIP, video streaming, video file, or text.

Alternatively, the application may be managed by distinguishing communication using middleware such as IMS as a single application.

Alternatively, an individual application such as Skype or LINE may be managed by being distinguished by an application name or an application ID.

Alternatively, the application may be managed by being distinguished as a different application by using a combination thereof.

Here, the applications that can be used by the UE 10 may be installed in the manufacturing step thereof, or may be installed by a user operation.

The UE 10 may be managed by correlating information of a communication path that can be used for each application with the application. For example, as shown in (a) of FIG. 4, categories (Cat. 1 to Cat. 3) are associated with the applications (APP 1 to APP 3). The respective categories are respectively correlated with the communication paths that can be used by the applications.

In the example of (a) of FIG. 4, the Cat. 1 indicates that it is possible to use the direct communication of the LTE(D), the Cat. 2 indicates that it is possible to use the direct communication of the WLAN(D), and the Cat. 3 indicates that it is possible to use the direct communication of the LTE(D) and the direct communication of the WLAN(D). In the case of the Cat. 3, the UE 10 can use the direct communication by selecting any one of the LTE(D) and the WLAN(D).

(b) of FIG. 4 is a diagram showing UE contact lists 144 for APPs. In (b) of FIG. 4, the contact list of the APP 1, the contact list of the APP 2, and the contact list of the APP 3 are managed. In the UE contact lists 144 for APPs, the UEs capable of performing direct communication through the ProSe are managed. Alternatively, the UEs capable of performing communication using the respective APPs may be managed.

Proximity discovery unnecessary check boxes indicating that it is not able to perform the proximity discovery on UEs may be managed in correlation with the UEs of the UE contact lists 144.

When the proximity discovery unnecessary check boxes are checked, the UEs of the UE contact lists 144 correlated with the checked check boxes means that it is not able to perform the proximity detection on the UE 10. That is, the UE 10 may manage whether or not to allow the respective UEs of the UE contact lists 144 to perform the proximity detection.

The proximity discovery unnecessary check boxes may be updated through configuration performed by a user.

Although it has been described in the present example that whether or not the proximity discovery is necessary is correlated with the respective APPs of the UE 10, whether or not the proximity discovery is necessary may be managed in correlation with the UE contact lists 144. In this case, whether or not the proximity discovery is necessary may be configured for all the UEs of the contact lists all at once.

Whether or not the proximity discovery is necessary may be managed in correlation with the UE contact lists 144 of all the applications. In this case, whether or not the proximity discovery is necessary may be configured for all the UEs of all the contact lists all at once.

That is, when the UE of the UE contact list 144 detects a proximity UE, the UE 10 can exclude the UE 10 itself from a detection target based on the proximity discovery unnecessary check boxes.

As shown in (b) of FIG. 4, the UEs capable of performing the direct communication through the ProSe may be managed for each application, and the fact that the proximity discovery is unnecessary may be managed for each UE managed by the contact lists.

The UE 10a to the UE 10n shown in (b) of FIG. 4 are UEs different from the UE 10 and the configurations thereof are the same as that of the UE 10, and thus, the detailed description thereof will be omitted.

[1.2.2 Configuration of ProSe Server]

Figure 5:
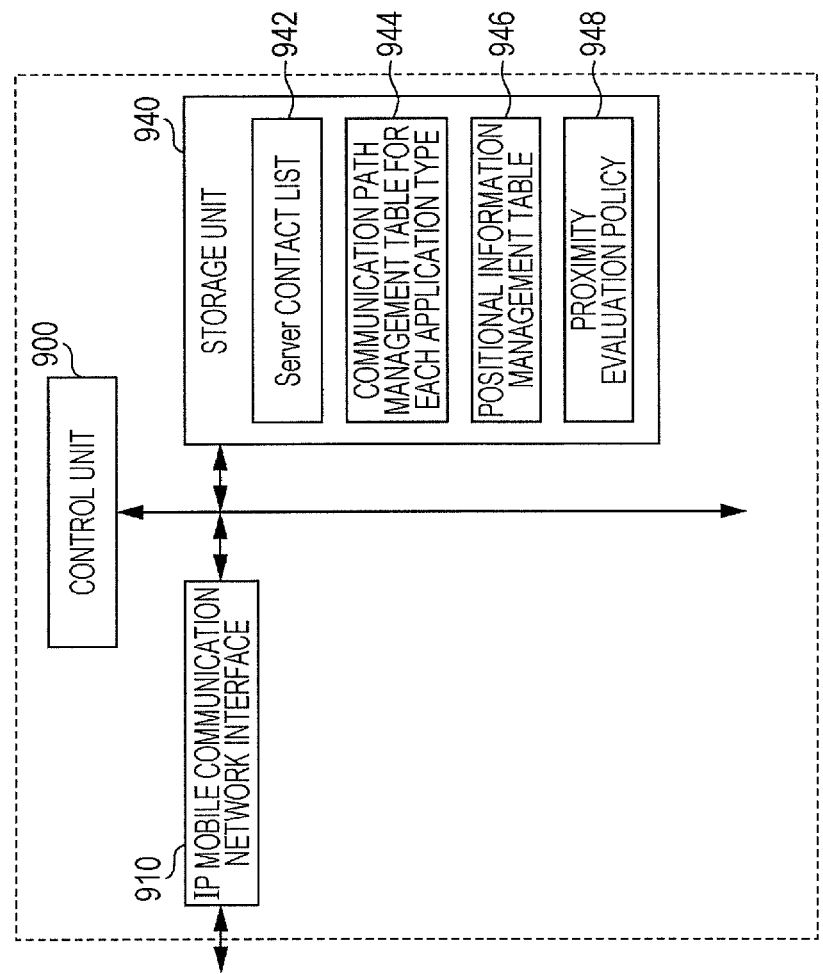
FIG. 5 is a diagram for describing the functional configuration of a ProSe Server.

FIG. 5 shows the functional configuration of the ProSe Server 90. In the ProSe Server 90, an IP mobile communication network interface 910 and a storage unit 940 are connected to a control unit 900 through a bus.

The control unit 900 is a functional unit for controlling the UE 10. The control unit 900 realizes various processes by reading various programs stored in the storage unit 940 and executing the read program.

The IP mobile communication network interface 910 is a functional unit for allowing the ProSe Server 90 to be connected to the IP mobile communication network 5.

The storage unit 940 is a functional unit that records programs and data required for various operations of the UE 10. For example, the storage unit 940 is a semiconductor memory, or a hard disk drive (HDD).

The storage unit 940 stores Server contact lists 942, a communication path management table 944, a positional information management table 945, and a proximity evaluation policy 948.

The Server contact lists 942, the communication paths for application classifications 944 and the positional information management table 946 may be stored in an external device. For example, these items may be stored in the HSS 50, and may be referred to or updated by inquiring of the HSS 50 if necessary.

Figure 6:
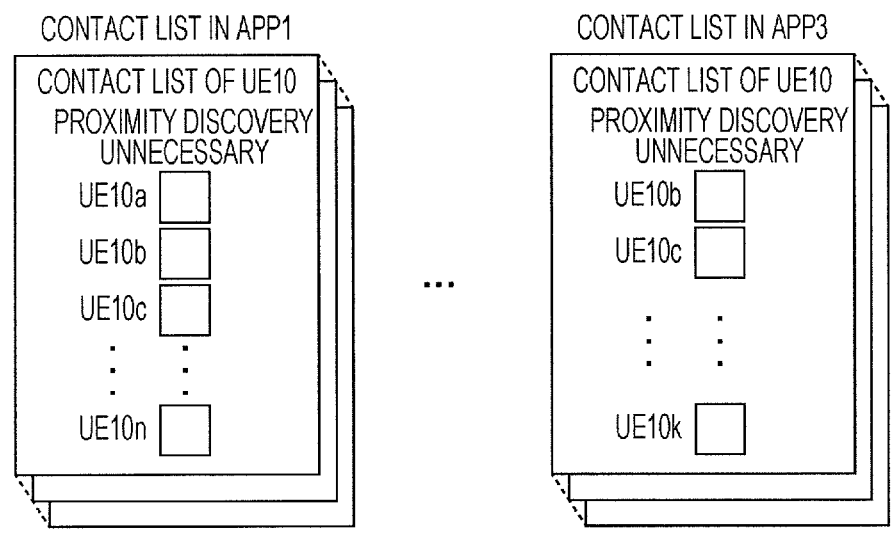
FIG. 6 is a diagram showing an example of a communication path for each application classification and Server contact list.

(a) of FIG. 6 shows an example in which the Server contact lists 942 are managed for applications that can be used by a certain UE in the example of the Server contact lists 942. In (a) of FIG. 6, contact lists in the APP 1 to the APP 3 of the UE 10 are represented.

The application may be managed by being distinguished from a different application according to data classification such as VoIP, video streaming, video file, or text.

Alternatively, the application may be managed by distinguishing communication using middleware such as IMS as a single application. Alternatively, an individual application such as Skype or LINE may be managed by being distinguished by an application name or an application ID. Alternatively, the application may be managed by being distinguished as a different application by using a combination thereof.

In the contact lists of (a) of FIG. 6, UE lists (UE 10a to UE 10n) that can perform the direct communication with the UE 10 through the ProSe may be managed by being correlated with proximity discovery unnecessary check boxes.

The proximity discovery unnecessary check box being checked means that the UE 10 is not able to detect the UEs managed as the proximity discovery unnecessary, as proximity terminals. That is, the ProSe Server 90 can manage whether or not to determine the respective UEs of the Server contact lists 942 as targets to be subjected to the proximity detection for each application of the UE 10. The proximity discovery unnecessary check boxes can be updated through configuration performed by the user.

Although it has been described in the present example that whether or not to the proximity discovery is necessary is correlated with the respective UEs of the Server contact lists 942, whether or not to the proximity discovery is necessary may be managed in correlation with the Server contact lists 942. In this case, whether or not to the proximity discovery is necessary may be configured for all the UEs of the Server contact lists 942 all at once.

Whether or not to the proximity discovery is necessary may be managed in correlation with all the applications. In this case, whether or not to the proximity discovery is necessary may be configured for all the UEs of all the Server contact lists 942 of the UE 10 all at once.

In the above description, although the contact list for each application of the UE 10 has been described, the ProSe Server 90 similarly stores the ProSe Server contact lists 942 of the UEs (for example, UE 10a to UE 10n) different from the UE 10.

(b) of FIG. 6 shows an example of the communication path management table 944 for each application classification. In the communication path management table 944 for each application classification, the applications are managed in correlation with the communications paths that can be used in the applications.

The application may be managed by being distinguished from a different application according to data classification such as VoIP, video streaming, video file, or text. Alternatively, the application may be managed by distinguishing communication using middleware such as IMS as a single application.

As the communication path that can be used in the application, the communication path such as the LTE(D), the WLAN(D) or another method that can be used is managed in correlation with each application.

In the example of (b) of FIG. 6, the categories (Cat. 1 to Cat. 3) that transmit and receive data through the ProSe permitted by the mobile communication provider are managed for applications or services. The Cat. 1 indicates that it is possible to use the direct communication of the LTE(D), the Cat. 2 indicates that it is possible to use the direct communication of the WLAN(D), and the Cat. 3 indicates that it is possible to use the direct communication of the LTE(D) and the direct communication of the WLAN(D). In the case of the Cat. 3, the UE 10 can selectively use any one of the LTE(D) and the WLAN(D).

For example, since the APP 1 is associated with the Cat. 1, the APP 1 is supported by the direct communication of the LTE(D). Since the APP 2 is associated with the Cat. 2, the APP 2 is supported by the direct communication of the WLAN(D). Since the APP 3 is associated with the Cat. 3, the APP 3 is supported by the direct communication of the LTE(D) and the direct communication of the WLAN(D). When it is possible to use the LTE(D) and the WLAN(D) as in the Cat. 3, the UE 10 can select the LTE(D) or the WLAN(D).

(a) of FIG. 7 shows an example of the positional information management table 946. In the positional information management table of (a) of FIG. 7, positional information items of the UEs capable of performing the direct communication through the ProSe are stored for the respective UEs. The ProSe Server 90 manages the positional information items notified from the UEs in the positional information management table 946.

In (a) of FIG. 7, the UE 10 is provided in a position A and a position a, and the UE 10a is provided in a position A and a position b. The UE 10b is provided in a position B, the UE 10c is provided in a position C, and the UE 10zz is provided in a position x.

As shown in (a) of FIG. 7, the positional information managed for each UE may be one or plural. The position A and the position a of the UE 10 may be, for example, identification information of an LTE base station and identification information of a WLAN base station to which the UE 10 is connected. In addition, the positional information managed for each UE may be positional information calculated by the GPS, or information for identifying an area. The positional information managed for each UE may be a SSID, a BSSID, or a Realm used for connection in the WLAL, or other information.

Although the position for each UE is managed irrespective of the service and application in (a) of FIG. 7, the position for each UE may be managed for each application or each service. When the position for each UE is managed for service, the position for each UE may be managed by being included in the contact list.

(b) of FIG. 7 shows an example of the proximity evaluation policy 948. The proximity evaluation policy 948 includes a rule for evaluating whether or not the UE 10 and another UE different from the UE 10 are positioned in proximity based on the positional information management table 946. The ProSe Server 90 may evaluate whether or not the communication path (LTE(D) and/or WLAN(D)) of the direct communication can be used between a communication source UE and a communication target UE based on the proximity evaluation policy 948.

(b) of FIG. 7 shows an example of the determined result and the content of the policy through the proximity evaluation policy 948. The content of the policy manages determination methods using an access point (AP) name, a service set identifier (SSID), a Realm (facility information), or an eNB ID (base station information of the mobile communication provider).

Here, the AP, SSID, and Realm are identifiers that can be obtained by the UE when the UE is connected to the WLAN, are obtained in any one of the WLAN APa 72 and the WLAN APb 76, and can be notified to the ProSe Server 90. The ProSe Server 90 manages the positions based on the notification of the positional information items of the UEs.

When the UE 10 is connected to the WLAN APa 72 or the WLAN APb 76, all of the AP, the SSID and the Realm may be obtained in some cases, or only any one of the AP, the SSID and the Realm may be obtained in some cases.

That is, the UE 10 may notify the ProSe Server 90 of all of the AP, the SSID and the Realm in some cases, or may notify the ProSe Server of only any one of the AP, the SSID and the Realm in some cases.

Even when the AP, the SSID and the Realm are obtained from the WLAN (WLAN APa 72 or WLAN APb 76), the UE 10 may not notify the ProSe Server 90 of any one of the AP, the SSID and the Realm or some thereof in some cases.

The eNB ID is an identifier that can be obtained when the UE 10 is connected to the eNB 45. When the eNB ID is newly obtained from the eNB 45, the UE 10 notifies the ProSe Server 90 of the obtained eNB ID. Even when the eNB ID is newly obtained, the UE 10 may not notify the ProSe Server 90 in some cases.

The contents of the respective policies will be described. The AP name is an identification name for identifying each WLAN. Since the UEs connected to the same AP are located in the area of the single WLAN and are in proximity to each other with a very high probability, these UEs are determined to use the WLAN(D).

The SSID is an identifier for identifying the WLAN. One SSID may be configured for only a single WLAN, or one SSID may be configured for a plurality of WLANs.

When one SSID is configured for the plurality of WLANs, since an office that is not covered by one WLAN may be present, the UEs that are positioned in the same SSID are in proximity to each other with a very high probability but not as high as the UEs that are positioned in the same AP are in proximity to each other, and thus, these UEs are evaluated to be able to use the WLAN(D).

The Realm is a name indicating facility information in the WLAN. Since the Realm is the name indicating the facility information, the UEs which have the same Realm and are connected to the WLAN are located in the facility corresponding to the Realm. Thus, the UEs positioned in the same Realm are in proximity to each other with a high probability but not as high as the UEs positioned the same AP or the same SSID are in proximity to each other, and thus, these UEs are evaluated to be able to use the WLAN(D).

The eNB 45 is an LTE base station managed by the mobile communication provider. When the UE 10 is connected to the eNB 45 in order to transmit and receive data to and from the LTE base station, the UE can detect the eNB ID. The UE 10 located in the LTE base station is positioned within a circular area having a radius of 500 m. Since two UEs are located in the same eNB, these UEs are evaluated to be able to use the LTE(D).

When there is not any correspondence, the UE is evaluated to be none. In this case, there are no usable direct communication paths, and the ProSe Server 90 may notify the UE 10 such that unnecessary proximity discovery is not performed.

[1.2.3 Configuration of MME]

Figure 8:
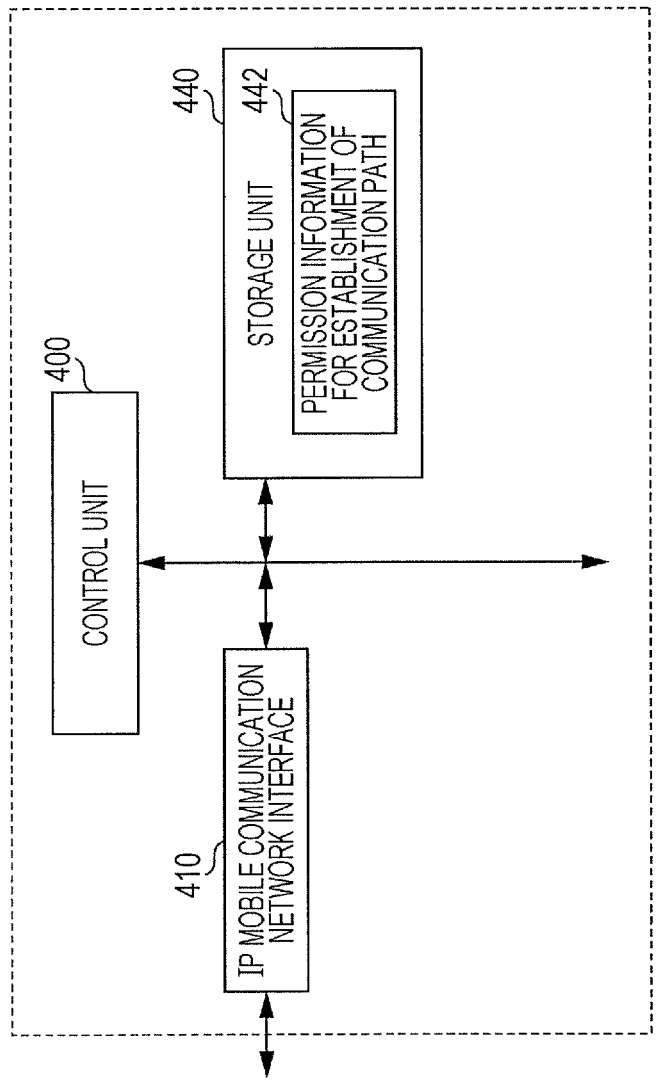
FIG. 8 is a diagram for describing the functional configuration of a MME.

FIG. 8 shows the functional configuration of the MME 40. In the MME 40, an IP mobile communication network interface 410, and a storage unit 440 are connected to a control unit 400 through a bus.

The control unit 400 is a functional unit for controlling the UE 10. The control unit 400 realizes various processes by reading various programs stored in the storage unit 440 and executing the read program.

The IP mobile communication network interface 410 is a functional unit for allowing the MME 40 to be connected to the IP mobile communication network 5.

The storage unit 440 is a functional unit that stores programs and data required for various operations of the UE 10. For example, the storage unit 440 is a semiconductor memory or a hard disk drive (HDD).

Permission information 442 for communication path establishment is managed in the storage unit 440. The permission information 442 for communication path establishment may be stored in an external device, and may be stored in, for example, the HSS 50.

FIG. 9 shows an example of the permission information 442 for communication path establishment. In FIG. 9, the communication path to be permitted is managed in correlation with an APN. Here, the APN is connection destination information for allowing the UE 10 to transmit and receive data by being connected to the IP mobile communication network 5.

Here, the UE 10 can use the communication path including a connection destination associated with the APN by notifying the permission information including the APN and being permitted from the MME 40 before the data is transmitted and received.

The APN is previously configured in the manufacturing step of the UE 10 in some cases, or the APN needs to be separately configured in some cases when a SIM card is separately attached to the UE. The APN may be managed for each communication path, or may permit each communication path.

For example, a plurality of APNs may be managed for communication path establishment or services to be provided, and the APN includes an APN for the communication path of the LTE(D) in the direct communication path may be managed for services, an APN correlated with permission information for the establishment of the communication path of the WLAN(D) in the direct communication path, and an APN which performs communication via the PGW 30 and is correlated with permission information for the establishment of the communication path via a macro.

Here, the communication via a macro means that the UE 10 transmits and receives data by using a communication path via a base station of a macro cell such as the eNB 45 using the LTE communication method. In this case, the UE 10 may request the establishment of PDN connection with the PGW 30 through the eNB 45 and the SGW 35, and may perform communication using the established PDN connection.

The UE 10 may request the establishment of a radio bearer with the eNB 45 and an EPS bearer with the SGW 35 and the PGW 45, and may perform the communication using the established bearer.

The base station is not limited to the macro base station of the macro cell by using the LTE communication method, but may be a home base station or a femto base station of a cell smaller than the macro cell.

In the example of FIG. 9, the LTE(D) is permitted in an APN 1, the WLAN(D) is permitted in an APN 2, and the LTE(D) and the WLAN(D) are permitted in an APN 3. In the APN 1, the APN 2 and the APN 3, the establishment of the PDN connection between the UE 10 and the PGW 30 is not permitted as the communication path by being connected to the core network through the LTE base station or the WLAN base station.

Here, the permission information for the APN is not intended as being permitted only for these APNs, but a different communication path may be permitted in an APN different from the APN 1 to the APN 3. The APN may be managed so as not to permit the establishment of the direct communication path of the LTE(D). Similarly, the APN may be managed so as not to permit the establishment of the direct communication path of the WLAN(D).

The MME 40 may determine whether or not to permit the establishment of the communication path based on the APN notified from the UE 10. For example, when the UE 10 notifies of the APN 1 which permits the establishment of the communication path of the LTE(D) and requests the establishment of the communication path of the LTE(D), it is possible to determine whether or not to permit the establishment of the communication path of the LTE(D) based on the APN notified from the UE 10 and the permission information 442 for communication path establishment.

As stated above, the MME 40 is a control device that determines whether or not to permit the service provision and the establishment of the communication path of the UE, and controls the communication path establishment or the service establishment.

1.3 Description of Process

Next, embodiments of a specific process in the mobile communication system will be described. In the present embodiment, the process includes a position registration procedure performed by the UE 10, a proximity discovery procedure of starting the transmission and reception of data, and a procedure of starting the transmission and reception of data.

In the following description, LTE Direct for establishing the direct communication path between the UEs by using the LTE communication method is referred to as LTE(D), and WLAN Direct for establishing the direct communication path between the UEs by using the WLAN communication method is referred to as WLAN(D). The function of the LTE(D) or the function of the WLAN(D) in the UE 10 or the UE 10*a* is valid.

1.3.1 UE Position Notification Procedure

An example of the position registration procedure performed by the UE 10 will be described with reference to FIG. 10. The UE 10 detects its own positional information, and notifies the ProSe Server 90 of the detected position. The positional information may be notified using a case where new positional information is detected or a case where new positional information is obtained as its trigger, or the positional information may be notified using the start of the application or the start of the UE as its trigger.

Hereinafter, an example in which the UE 10 obtains new positional information along with its own movement will be described. Although the UE 10 will be described in the following description, the same procedure may be used in the UE 10*a*.

Initially, the UE 10 obtains new positional information along with its own movement (S1002). Here, new connection information is, for example, information for identifying the WLAN base station, and may be an access point (AP) name.

An AP may be connected to any one of the WLAN APa 72 and the WLAN APb 76. The new positional information may be obtained when the power of the UE 10 is newly turned on even though this UE 10 does not move, or may be obtained when this UE is connected to a new AP due to the ON of the WLAN function.

The new connection information may be obtained by detecting that the SSID or the Realm is obtained from the WLAN (WLAN APa 72 or WLAN APb 76) in addition to detecting that the new AP name is obtained. The new positional information may be obtained by detecting that the eNB ID obtained from the eNB 45 or TAI obtained from the MME 40 are obtained. In this case, a plurality of new connection information items may be obtained.

When GPS information is obtained, the UE 10 may notify the ProSe Server 90 of the positional information. When the GPS information is obtained, the UE 10 does not necessarily notify the ProSe Server 90 of the positional information, but may notify the ProSe Server 90 of the positional information every a predetermined period of time.

The UE 10 that determines to notify of the connection information discovers the ProSe Server 90, and ensures secure communication with the ProSe Server 90 (S1004). The UE 10 previously retains information for being connected to the ProSe Server 90. The UE 10 may be connected to the ProSe Server 90 via the eNB 45 or the WLAN (WLAN APa 72 or WLAN APb 76).

Here, for example, the secure communication being ensured means that communication is performed after connection authentication is performed by, for example, the ProSe Server 90 or a device within another core network, or a high-security communication path using IPSec is established and communication is performed through the established communication path. Another method for increasing security may be used.

Subsequently, the UE 10 that ensures the secure communication with the ProSe Server 90 notifies the ProSe Server of positional information of the UE 10 (S1006). Here, the positional information notified from the UE 10 may be the AP name obtained from the WLAN (WLAN APa 72 or WLAN APb 76), or may be the SSID or the Realm name. The positional information may be the eNB ID obtained from the eNB 45, or may be the TAI obtained from the MME 40. Positional information obtained using the GPS may be notified. When the plurality of new connection information items is obtained, the plurality of new connection items may be notified.

The ProSe Server 90 that is notified of the positional information of the UE 10 receives the positional information of the UE 10 from the UE 10, and updates the positional information of the UE (S1008). In this case, when the plurality of positional information items (any combinations of AP, SSID, Realm, eNB ID, TAI and GPS may be used) is received from the UE 10, the ProSe Server 90 may update the plurality of positional information items of the UE 90.

In the present embodiment, the positional information is updated within the ProSe Server 90. However, when the positional information is managed in a device different from the ProSe Server 90, the positional information may be updated in this device, and this device may be, for example, the HSS 50 managed by the mobile communication provider.

FIG. 11 shows examples of the positional information management table 946 before and after the update is performed. Here, the UE 10 notifies the ProSe Server of AP m as the positional information. The AP m may be an AP name which is identification information of the WLAN base station.

A position AP n indicates that the AP name is AP n, and a position eNB p indicates that the eNB ID is eNB p. The eNB p may be an eNB ID which is identification information of the LTE base station. A position SSID m indicates that the SSID is SSID m. A position Realm n indicates that the Realm name is Realm n.

In the positional information management table 946 before the update is performed, the UE 10 is managed as being located in the position AP n and the position eNB p. The ProSe Server 90 changes the position AP n of the UE 10 to the position AP m based on the positional information from the UE 10.

When the positional information from the UE 10 is not received, the ProSe Server 90 determines that there are no proximity UEs capable of performing the transmission and reception of data through the ProSe. Here, the transmission and reception of data through the ProSe means the transmission and reception of data in the direct communication path between the UEs based on the LTE(D) or the WLAN (D).

[1.3.2 Proximity Discovery Unnecessary Procedure]

Next, a proximity discovery unnecessary procedure will be described. The proximity discovery unnecessary procedure is performed in order for a certain UE not to be detected as a proximity UE by another UE. Here, a procedure example in which the UE 10*c* different from the UE 10 is not detected as a proximity UE of the UE 10 by the UE 10 will be described.

The proximity discovery unnecessary procedure will be described with reference to FIG. 12. Initially, the UE 10*c* detects the proximity discovery unnecessary (S1202). Here, for example, the proximity discovery unnecessary may be configured such that the UE 10*c* is not detected by a specific UE through a terminal operation of the user, and may be detected based on the configuration.

The UE 10 that detects the proximity discovery unnecessary ensures the secure communication with the ProSe Server 90 (S1204). When secure communication means is already ensured, the UE 10 previously obtains information indicating the position of the ProSe Server 90, and thus, it is possible to detect the ProSe Server 90.

Here, for example, the secure communication being obtained means that communication is performed after connection authentication is performed by the ProSe Server 90 or a device within another core network, or a high-security communication path using IPSec is established and communication is performed through the established communication path. Another method for increasing security may be used.

Thereafter, the UE 10c transmits a proximity discovery unnecessary notification to the ProSe Server 90 (S1206). When another UE different from the UE 10c requests the detection of proximity UEs from the ProSe Server, the UE 10c requests the excluding of the UE 10c from a proximity detection target from the ProSe Server 90 by transmitting the proximity discovery unnecessary notification. In other words, the UE 10c refuses to be detected as the proximity terminal.

Here, the UE 10c may transmit a notification including information indicating the proximity discovery unnecessary, a specific application, and information for identifying a specific UE.

In the following description, an example in which the UE 10c transmits a notification including the information indicating the proximity discovery unnecessary, the APP 1 and the UE 10 will be described.

The ProSe Server 90 receives the proximity discovery unnecessary notification from the UE 10c, and performs a proximity discovery unnecessary notifying process based on the notified information (S1208). The ProSe Server 90 updates the contact lists such that the UE 10c is not discovered by another UE in the proximity discovery unnecessary notifying process.

FIG. 13 shows an example of the update in the proximity discovery unnecessary notifying process. Here, an example in which the information indicating the proximity discovery unnecessary, the APP 1 and the UE 10 are received through the notification of the UE 10c will be described.

The ProSe Server 90 specifies the Server contact list 942 correlated with the APP 1 of the UE 10 based on the received information. As shown in FIG. 13, the update is performed by checking the proximity discovery unnecessary check box of the UE 10c in a non-update state in which the proximity discovery unnecessary check box of the UE 10c is not checked.

Thus, when the UE 10 requests the detection of whether or not there is a proximity terminal that performs communication in the APP 1 from the ProSe Server 90, the ProSe Server 90 detects a proximity terminal by excluding the UE 10c from the target. That is, even though the UE 10c is positioned in the proximity of the UE 10, the UE 10c is not detected as the proximity terminal by the ProSe Server 90.

When another UE different from the UE 10c requests the detection of the proximity UE from the ProSe Server 90, the UE 10c may request the including of the UE 10c in a proximity detection target from the ProSe Server 90 by transmitting the proximity discovery unnecessary notification. In other words, the UE 10c cancels the state in which the UE 10c refuses to be detected as the proximity terminal, and changes to a state in which the UE 10c permits to be detected as the proximity terminal.

Here, the UE 10c may transmit a notification including information indicating that the proximity discovery is permitted, a specific application, and information for identifying a specific UE.

The ProSe Server 90 receives the notification from the UE 10c, specifies the Server contact list 942 in the same process as the process of configuring the proximity discovery necessary, and updates the Server contact list such that the UE 10c is included in the proximity discovery target by unchecking the check box based on the received information.

As stated above, UEs other than the UE 10c may request the excluding of the other UEs from the proximity discovery target, similarly to the UE 10c. Accordingly, the UE 10 that requests the detection of the proximity UE requests the notification of information regarding the proximity UE among the UEs which do not want to be subjected to the proximity discovery.

When the information regarding the proximity UE is requested from a certain UE, the ProSe Server 90 detects the proximity UE among the UEs which do not want to be subjected to the proximity discovery, and provides the information regarding the proximity UE.

Although it has been described in the present example that the UE 10c transmits the notification including the information indicating the proximity discovery unnecessary, the APP 1 and the information for identifying the UE 10, the UE 10c may transmit a notification including information the proximity discovery unnecessary and the APP 1.

In this case, the UE 10c does not refuse to be subjected to the proximity discovery by a specific UE, but the Server contact list 942 correlated with the APP 1 is configured such that the UE 10c is not subjected to the proximity discovery by all the UEs.

Specifically, the ProSe Server 90 detects whether or not the UE 10c is included in the Server contact list 90 correlated with the APP 1 of all the UEs, and updates the Server contact list such that the UE 10c is not subjected to the proximity discovery by checking the check box correlated with the UE 10c.

The UE 10c may transmit a notification including information indicating the proximity discovery unnecessary and information for identifying the UE 10.

In this case, the Server contact lists 942 for the all the applications correlated with the UE 10 is configured such that the UE 10c is not subjected to the proximity discovery.

Specifically, all the Server contact lists 942 of the UE 10 are updated such that the proximity discovery is not performed by detecting whether or not the UE 10c is listed and by checking the check box correlated with the UE 10c.

[1.3.3 Proximity Detection Procedure]

A proximity evaluation process for allowing the ProSe Server 90 to start the transmission and reception of data will be described. The proximity evaluation procedure by determining to start the transmission and reception of data will be described with reference to FIG. 14.

The ProSe Server 90 may start the proximity evaluation procedure based on the notification of the positional information of the UE, or may start the proximity evaluation procedure based on the notification of the proximity discovery unnecessary. Alternatively, the ProSe Server may start the proximity evaluation procedure at any timing. The result (the notification of the contact list of S1412) of the proximity detection is notified to the UE 10, but may be similarly used in the UE 10a.

First, the ProSe Server 90 shown in FIG. 14 initially performs a proximity evaluation process in the proximity evaluation procedure (S1410). In the proximity evaluation process, it is evaluated whether or not the UE within the contact list 942 of the UE 10 and the UE 10 that transmits the positional information in a UE position registration procedure are positioned in proximity to each other. It may be evaluated whether or not the direct communication based on the LTE(D) or the WLAN(D) is performed.

Figure 15:
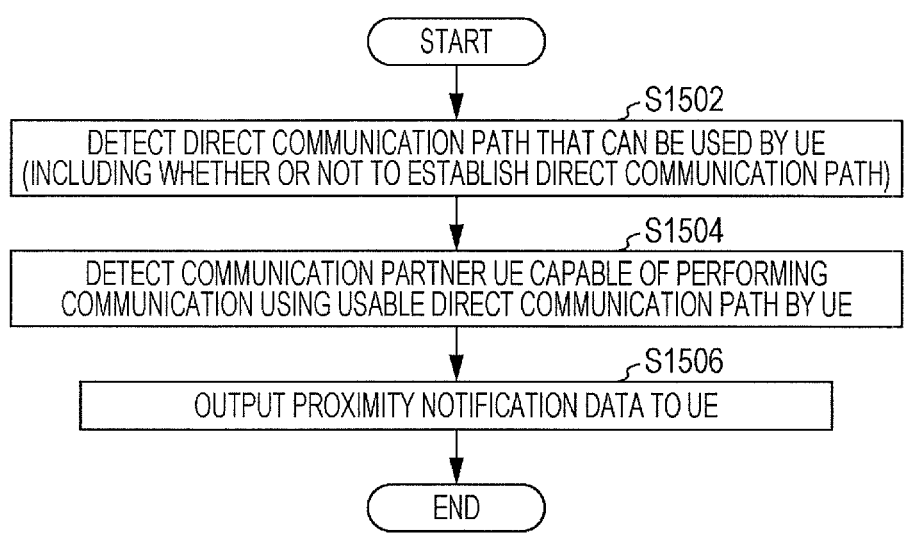
FIG. 15 is a diagram for describing a proximity detection process according to the first embodiment.

FIG. 15 shows an example of a procedure of the proximity evaluation process. In the present example, an example in which the UE 10 performs the position registration, the ProSe Server 90 performs the proximity evaluation process on the UE 10 after the position registration procedure is completed will be described.

Initially, the direct communication path that can be used by the UE 10 is detected (S1502). Here, in order to detect the direct communication path that can be used by the UE 10, the ProSe Server 90 may detect the application based on the communication path management table 944 for each application classification. The ProSe Server 90 may detect from the direct communication path that can be used by the UE 10 based on the communication path management table 944 for each application classification. The ProSe Server may detect all the applications of the contact lists of the UE 10 managed in the Server contact list 942. Alternatively, the UE 10 may notify the ProSe Server 90 of the APP requested for the detection, and the ProSe Server 90 may detect the direct communication path that can be used for the APP 1.

Thus, the ProSe Server 90 can detect that the communication path based on the LTE(D) can be used for the APP 1, as the direct communication path that can be used by the UE 10. The ProSe Server can detect that the communication path based on the WLAN(D) can be used for the APP 2. The ProSe Server can detect that the communication path based on the LTE(D) or the communication path based on the WLAN(D) can be used for the APP 3.

Subsequently, the proximity UE of the UE 10 is detected based on the direct communication path that can be used by the UE 10 detected in S1502 (S1504). Here, in order to detect the UE as the communication partner that can communicate with the UE, the ProSe Server 90 may detect the UE by using the proximity evaluation policy 948, the positional information management table 946 and the Server contact list 942 of the UE 10.

For example, it may be determined whether or not the UE is located in proximity by extracting the UE 10, the positional information of the UE retained in the Server contact list 942 of the APP 1 of the UE 10, and the positional information of the UE 10 from the positional information management table 942 correlated with each UE and comparing the two extracted positional information items.

For example, as shown in (b) of FIG. 7, the determination method based on the positional information may be performed by determining that two UEs are located in proximity enough to perform the communication based on the WLAN(D) since the two UEs are located in the same WLAN base station. The determination method may be performed by determining that two UEs are located in proximity enough to perform the communication based on the WLAN(D) since the two UEs are located in the WLAN base stations having the same SSID. The determination method may be performed by determining that two UEs are located in proximity enough to perform the communication based on the WLAN(D) since the two UEs are located in the WLAN base stations having the same Realm. The determination method may determine that two UEs are located in proximity enough to perform the communication based on the LTE(D) since the two UEs are located in the same LTE base station (eNB). When there is not any correspondence case, the determination method may be performed by determining that two UEs are separated at a distance enough to perform neither the communication based on the WLAN(D) nor the communication based on the LTE(D) (none).

As the example of the determination method, it has been described in the present example that the determination is performed using the information of the AP name, the SSID, the Realm or the eNB, but the determination method is not limited thereto. It may be detected that the UEs are in proximity using the GPS information, and it may be determine whether or not the communication based on the LTE(D) can be performed or the communication based on the WLAN(D) can be performed.

A specific example in which the ProSe Server 90 detects the proximity UE of the UE 10 (S1504) will be described. When the UE 10 requests the detection of the proximity UE capable of performing the communication in the APP 1, the ProSe Server detects the direct communication path that can be used by the UE 10 based on the request from the UE 10 (S1502). As described above, detection means detects that the communication can be performed based on the LTE(D) in the APP 1 based on the detected direct communication path.

The UE located in proximity enough to perform the communication based on the detected usable communication path (LTE(D)) is extracted based on the Server contact list 942, the positional information management table 946 and the proximity evaluation policy 948. Specifically, the UE using the same LTE base station (eNB) as the positional information may be detected.

The detection of whether or not the UE notified as the proximity discovery unnecessary on the Server contact list 942 to the ProSe Server is in proximity is not performed. For example, in the state in which the contact list of the APP 1 in FIG. 13 is updated, the proximity discovery unnecessary checkbox of the UE 10c is checked. Thus, the detection of whether or not the UE 10c is in the proximity of the UE 10 is not performed.

In this case, since the communication path that can be used in the APP 1 is the communication based on the LTE(D), it is not necessary to determine whether or not there is the UE in proximity enough to perform the communication based on the WLAN(D).

In so doing, the ProSe Server 90 can detect that the communication path that can be used by the UE 10 in the APP 1 is the communication based on the LTE(D) and can detect the UE in proximity enough to perform the communication based on the LTE(D). The detected UE may be plural in number.

Next, a specific example in which the ProSe Server 90 detects the proximity UE of the UE 10 when the UE 10 requests the detection of the proximity terminal capable of performing the communication in the APP 2 (S1504) will be described. The ProSe Server detects the direct communication path that can be used by the UE based on the request from the UE 10 (S1502). As described above, detection means detects that it is possible to perform the communication based on the WLAN(D) in the APP 2 based on the detected direct communication path.

The UE in proximity enough to perform the communication based on the detected usable communication path (WLAN(D)) is extracted based on the Server contact list 942, the positional information management table 946 and the proximity evaluation policy 948. Specifically, the UE using the same WLAN base station as the positional information may be detected.

The detection of whether or not the UE notified as the proximity discovery unnecessary on the Server contact list 942 to the ProSe Server 90 is in proximity is not performed.

In this case, since the communication path that can be used in the APP 2 is the communication based on the WLAN(D), it is not necessary to determine whether or not there is the UE in proximity enough to perform the communication based on the LTE(D).

In so doing, the ProSe Server 90 can detect that the communication path which can be used by the UE 10 in the APP 2 is the communication based on the WLAN(D), and can detect the UE in proximity enough to perform the communication based on the WLAN(D). The detected UE may be plural in number.

Next, a specific example in which the ProSe Server 90 detects the proximity UE of the UE 10 when the UE 10 requests the detection of the proximity UE capable of performing the communication in the APP 3 (S1504) will be described. The ProSe Server 90 detects the direct communication path that can be used by the UE based on the request from the UE 10 (S1502). As described above, detection means detects that the communication can be performed based on the LTE(D) in the APP 3 and the communication can be performed based on the WLAN(D) based on the detected direct communication path.

The UE in proximity enough to perform the communication based on the detected usable communication path is extracted based on the Server contact list 942, the positional information management table 946 and the proximity evaluation policy 948.

When the usable communication path is plural in number, for example, when the communication based on the LTE(D) is performed and the communication based on the WLAN (D) is performed, it is determined whether or not the respective UEs of the Server contact list 942 are in proximity enough to perform the communication based on the LTE(D), these UEs are in proximity enough to perform the communication based on the WLAN(D), these UEs in proximity enough to perform the communication based on the communication in both the LTE(D) and the WLAN(D), or these UEs are separated at a distance enough not to perform the communication in both the LTE(D) and the WLAN(D). As described above, determination means may perform the detection based on the positional information of the UEs.

The detection of whether or not the UE notified as the proximity discovery unnecessary on the Server contact list 942 to the ProSe Server 90 is in proximity is not performed. For example, in the state in which the contact list of the APP 1 in FIG. 13 is updated, the proximity discovery unnecessary check box of the UE 10c is checked. For this reason, it is not detected whether or not the UE 10c is in the proximity of the UE 10.

In so doing, the ProSe Server 90 can detect the proximity UE communicating with the UE 10 through the APP 3, and the communication path that can be used for the proximity UE. The detected UE may be plural in number. The usable communication path detected based on the positional information may be different for each proximity UE.

For example, as shown in (c) of FIG. 16, only the communication based on the LTE(D) can be used for the UE 10b, only the communication based on the WLAN(D) can be used for the UE 10d, and both the communication based on both the LTE(D) and the WLAN(D) can be used for the UE 10a.

Referring back to FIG. 14, the ProSe Server 90 that completes the evaluation within the Server contact list 942 of the UE 10 in S1410 notifies the UE 10 of the proximity UE and the information regarding the usable communication path (S1412). For example, as shown in FIG. 16, the information regarding the proximity UE and the usable communication path correlated with the proximity UE are transmitted to the UE 10.

As shown in (a), (b) and (c) of FIG. 16, the notification information transmitted to the UE 10 may be notified for each application. Here, in the example of FIG. 16, (a) of FIG. 16 shows the notification information regarding the APP 1, (b) of FIG. 16 shows the notification information regarding the APP 2, and (c) of FIG. 16 shows the notification information regarding the APP 3.

Through the above procedure, the UE 10 can detect the UE capable of using the direct communication (LTE(D) or WLAN(D)) from the Server contact list 942, and can determine to perform the proximity discovery.

The proximity detection in the ProSe Server 90 can be performed based on the request for the detection of the proximity terminal of the UE 10, and can obtain the detection result as the UE 10a. Means for requesting the detection of the proximity terminal of the UE 10 may perform the request for the detection of the proximity terminal by requesting the registration of the positional information, or means for transmitting a message indicating the request for the detection of the proximity terminal to the ProSe Server 90, other than the request for the registration of the positional information may be used.

As stated above, since the procedure of establishing the direct communication path is performed by detecting that there is the UE in proximity enough to perform the direct communication, the procedure of establishing the direct communication path that is unnecessarily performed even though it is not able to perform the direct communication with the UE is not performed. Thus, it is possible to suppress an unnecessary procedure, an unnecessary terminal discovery process, and a resource regarding terminal discovery.

[1.3.4 Communication Path Establishment Procedure]
[1.3.4.1 Communication Path Establishment Procedure 1]

Next, a procedure until the transmission and reception of data is started through the direct communication after the proximity discovery is performed on the UE capable of performing the direct communication will be described. In the following description, the UE 10 detects the UE positioned in proximity enough to perform the communication by using the APP 1 as already described above. The information regarding the usable direct communication path is obtained.

Figure 17:
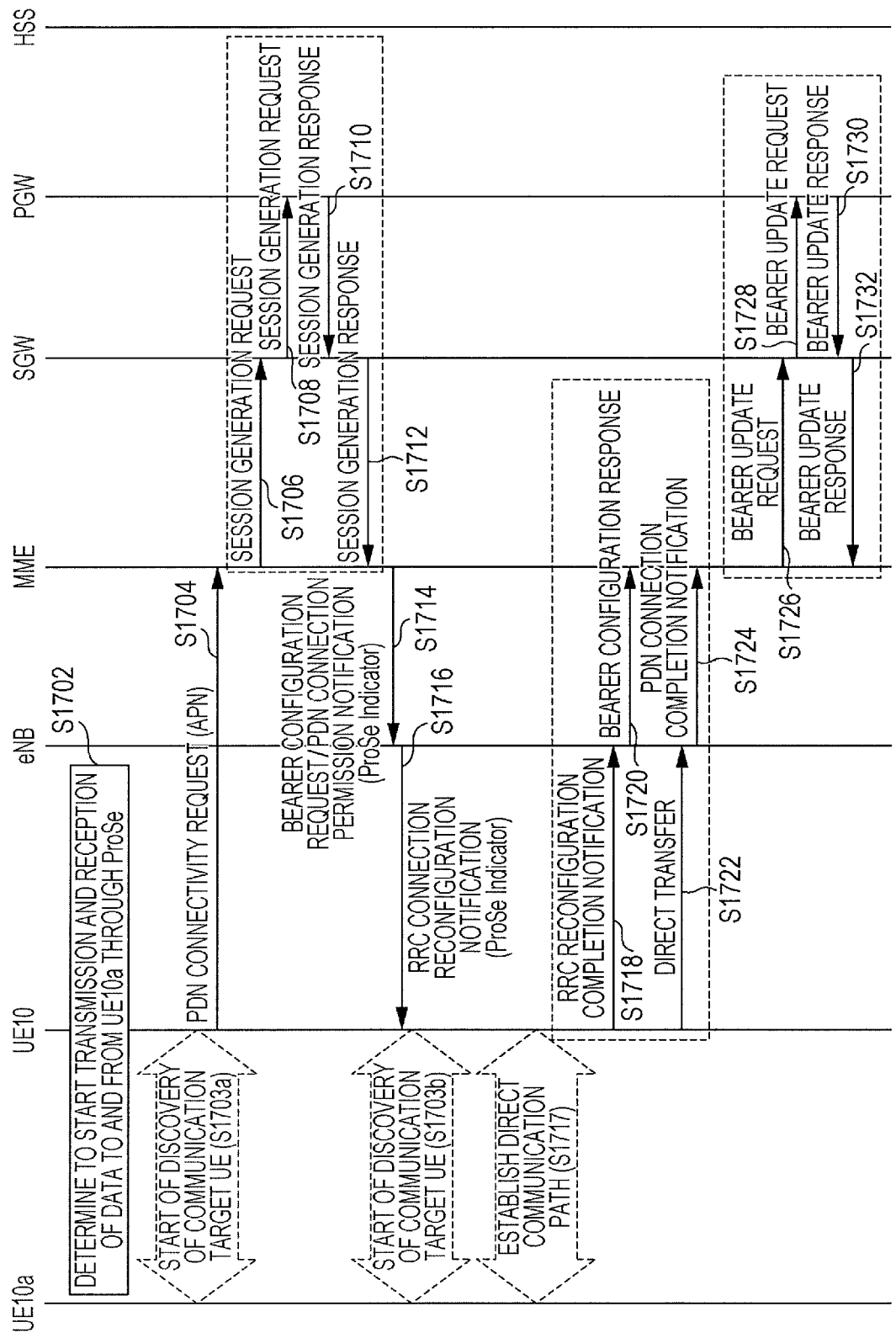
FIG. 17 is a diagram for describing a communication path establishment procedure based on a PDN connection request according to the first embodiment.

In the present example, a procedure starting from in the state in which the UE 10 detects the UE 10a as the UE positioned in proximity and it is detected the usable communication path is the communication path based on the LTE(D) based on the notification from the ProSe Server 90 will be described with reference to FIG. 17.

The UE 10 determines to start the transmission and reception of data to and from the UE 10c through the ProSe. This determination may be performed by determining to start the communication by selecting the UE 10a among the proximity terminals by the user of the UE 10, based on the information of the proximity notified from the ProSe Server 90.

Before the communication path based on the LTE(D) with the UE 10a is established, the UE 10 may start the discovery of the communication target UE (S1703a). The discovery of the UE is performed by actually checking whether or not the communication path based on the LTE(D) is established with the UE 10a.

Even though the ProSe Server 90 notifies that the UE 10 is in proximity enough to establish the communication path based on the LTE(D) with the UE 10a, since it is not apparent that the communication path is actually established, the UE is discovered.

Specifically, the discovery of the proximity terminal is performed by transmitting broadcast information based on the frequency used in the LTE wireless access method to a proximity area, and the proximity terminal sends a response to the discovery of the proximity terminal. Among the responses from the proximity terminals which are received by the UE 10, it may be detected that UE 10a is in proximity by detecting the response from the UE 10a.

The UE 10 establishes the communication path based on the LTE(D) with the UE 10a based on the approval of the communication provider. As the method of requesting the approval of the communication provider, a PDN connectivity request to the MME 40 may be transmitted based on a UE requested PDN connectivity procedure requested from the UE (S1704). Here, the UE 10 transmits the PDN connectivity request including the APN. The PDN connectivity request is a request transmitted from the UE 10 to the MME 40 in order to establish the PDN connection.

The UE 10 retains the APN correlated with the usable direct communication path, and selects the APN correlated with the LTE(D) when the direct communication path that can be used in the APP 1 is the LTE(D) and the UE 10 requests the approval for the establishment of the direct communication path based on the LTE(D).

The APN managed in correlation with the direct communication path may be plural in number. For example, a plurality of APNs such as an APN 1 correlated with the LTE(D), an APN 2 correlated with the WLAN(D) and an APN 3 correlated with the plurality of direct communication paths such as the LTE(D) and the WLAN(D) may be managed.

This means that the APN is managed in correlation with the permission information for the establishment of the direct communication path, and for example, the APN is managed such that the LTE(D) is permitted in the APN 1, the WLAN(D) is permitted in the APN 2, and the LTE(D) and the WLAN(D) are permitted in the APN 3.

The UE 10 may retain an APN other than the APN which permits the establishment of the direct communication path, such as an APN 4 which does not permit the establishment of the direct communication path.

In order to request the permission for the establishment of the direct communication path of the LTE(D) from the MME 40, the UE 10 selects the APN which permits the LTE(D) among the plurality of APNs, and adds the selected APN to the PDN connectivity request.

Although it has been described in the above example that the UE 10 can select the APN 1 or the APN 3, the UE may manage the application in correlation with the APN such that the APN 1 is used for the APP 1, and may select the APN based on the correlation information. Alternatively, the APN may be arbitrarily selected.

In the discovery of the communication target UE, the resolution of the IP address of the UE 10a may be performed. In order to perform the resolution of the IP address, the IP address of the UE 10a may be simultaneously included when the UE 10 receives a response from the UE 10a.

When the PDN connectivity request is transmitted to the MME 40 (S1704), the UE 10 adds the APN correlated with the usable communication path in the UE 10a notified in the Server contact list 942 to the PDN connectivity request. Here, since the direct communication of the LTE(D) is used, the APN 1 is included.

The WLAN(D) may be established in any type of application. When both the LTE(D) and the WLAN(D) can be used, the UE 10 may arbitrarily determine any one of the LTE(D) and the WLAN(D), or may determine any one of the LTE(D) and the WLAN(D) by using the notification from the network.

Subsequently, the MME 40 receives the PDN connectivity request transmitted from the UE 10, and checks the APN included in the PDN connection. The checking of the APN is performed by determining that the received APN is an APN which permits the LTE(D) based on the permission information 442 for the communication path establishment. Thus, the MME 40 detects that the UE 10 requests the permission for the establishment of the direct communication path based on the LTE(D).

The MME 40 manages the APN that can be used for each UE, and determines whether or not the UE 10 can use the APN notified from the UE 10. When it is possible to use the notified APN, the MME permits the establishment of the communication path correlated with the establishment of the direct communication path correlated with the APN and the request for the proximity detection, and when it is not able to use the notified APN, the MME does not permit the communication path establishment.

Through the above procedure, the MME 40 can determine to permit the establishment of and the direct communication path based on the LTE(D) of the UE 10.

When the MME 40 determines to permit the communication path establishment, the MME 40 transmits a bearer configuration request/PDN connection permission notification to the eNB 45 (S1714), and the eNB 45 transmits the RRC connection reconfiguration notification to the UE 10 (S1716). Thus, the MME 40 notifies the UE 10 that it is determined to permit the establishment of the direct communication path based on the LTE(D).

Here, a flag such as ProSe Indicator which explicitly indicates that the establishment of the PDN connection between the UE and the PGW of the related art and the establishment of the direct communication path is permitted may be included in the bearer configuration request/PDN connection permission notification and the RRC connection reconfiguration notification.

The MME 40 may determine such that the session executed in the SGW 35 and the PGW 30 is not generated based on the APN. The MME may determine such that a generation procedure of the session executed in the SGW 35 and the PGW 30 is not performed by detecting that the establishment of the direct communication path is requested based on the ProSe Indicator.

When it is determined not to generate the session, a session generation request (S1706) transmitted from the MME 40 to the SGW 35, a session generation request (S1708) transmitted from the SGW 35 to the PGW 30, a session generation response (S1710) transmitted from the PGW 30 to the SGW 35, and a session generation response (S1712) transmitted from the SGW 35 to the MME 40 as responses to these requests may not be transmitted and received.

As stated above, the MME 40 may generate the session within the core network depending on the APN that grants the permission, that is, may select whether or not to establish the communication path such as the PDN connection.

The eNB 45 may determine whether or not to establish the wireless communication path for transmitting and receiving data with the UE 10 by including the ProSe Indicator.

For example, the eNB may detect that the establishment requested from the UE 10 is the direct communication path between the UEs, and may not establish the wireless communication path for transmitting and receiving data including the allocation of the radio resource between the eNB 45 and the UE 10 based on this detection.

The eNB may detect that the establishment requested from the UE 10 is not the direct communication path between the UEs, and may establish the wireless communication path for transmitting and receiving data including the allocation of the radio resource between the eNB 45 and the UE 10 based on this detection.

Thereafter, the UE 10 receives the RRC connection reconfiguration notification from the eNB 45, and detects that the establishment of the communication path based on the LTE(D) is permitted. The detection may be performed by detecting that the ProSe Indicator is included in the notification.

The MME 40 may notify the UE 10 of the bearer configuration request/PDN connection permission notification and the RRC connection reconfiguration notification including the information regarding the bearer ID or the IP address used by the UE 10 in order to perform the communication using the direct communication path or a frequency used for the direct communication.

Although it has been described that the discovery of the communication target UE is started before the PDN connection request is transmitted (S1703*a*), the discovery may be started after the RRC connection reconfiguration notification is received (S1703*b*).

The PDN connection request PDN connection request UE 10 receives the RRC connection reconfiguration notification, and establishes the direct communication path with the UE 10*a* when the communication path establishment is permitted by the MME 40 (S1717). When the communication path establishment is not permitted, the establishment of the direct communication path may not be performed.

The UE 10 may determine whether or not to establish the direct communication path based on the direct communication path permitted by the MME 40, and the communication path correlated with the APP. Alternatively, the UE 10 may determine whether or not to establish the direct communication path based on any one of the direct communication path permitted by the MME 40, and the information regarding the communication path correlated with the APP.

For example, when the direct communication path correlated with the APP 1 is the LTE(D) and the APN permitted by the MME permits the establishment of both the LTE(D) and the WLAN(D), since the LTE(D) is correlated with the APP 1 and the LTE(D) is permitted by the APN, the UE 10 determines to establish the direct communication path of the LTE(D).

In the establishment procedure of the direct communication path based on the LTE(D) with the UE 10*a*, the UE 10 may establish the direct communication path using the frequency included in the information regarding the establishment of the direct communication path obtained from the RRC connection reconfiguration notification, or may establish the direct communication path by previously allocating a frequency to be used.

Here, the IP address or the bearer ID included in the information regarding the establishment of the direct communication path obtained from the RRC connection reconfiguration notification may be notified to the UE 10*a*, the notified IP address or bearer ID may be managed in correlation with the direct communication path, and the correlated IP address or bearer ID may be used at the time of performing the direct communication.

At the time of establishing the direct communication path with the UE 10*a*, any one of the UE 10 and the UE 10*a* may allocate the IP address or the bearer ID and may notify the other one of the IP address or bearer ID, and the other one may obtain the notified IP address or bearer ID, may manage the obtained IP address or bearer ID in correlation with the direct communication path, and may use the IP address or bearer ID at the time of performing the direct communication.

As discussed above, the UE 10 and the UE 10*a* can start the communication by establishing the direct communication path. When the communication path based on the LTE(D) is established for the communication of the APP 1, the UE 10 selects the direct communication path in order to transmit communication data of the APP 1, and transmits the communication data of the APP 4.

More specifically, at the time of transmitting user data of the APN 1, the correlated IP address may be selected, and the communication may be performed. The correlated bearer ID may be selected, the communication path may be specified, and the communication may be performed.

As for another application different from the APP 1, the communication is performed by establishing the connection with the PGW and selecting a communication path different from the direct communication path.

The UE 10 in which the establishment of the communication path of the LTE(D) with the UE 10*a* is completed may transmit a RRC reconfiguration completion notification to the eNB 45 (S1718). The eNB 45 may transmit the bearer configuration response to the MME 40 by checking that the UE 10 and the UE 10*a* establish the direct communication path of the LTE(D) (S1720).

As mentioned above, the UE 10 may notify the MME 40 that the establishment of the direct communication path is completed by transmitting the RRC reconfiguration completion notification and the bearer configuration response.

The RRC reconfiguration completion notification and the bearer configuration response may not be transmitted. For example, the UE 10 may determine to perform the transmission when the PDN connection between PGW 30 and the UE 10 of the related art is established, but may determine not to transmit when the direct communication path is established.

The UE 10 that completes the establishment of the communication path of the LTE(D) with the UE 10*a* may transmit a direct transfer message to the eNB 45 (S1722). The eNB 45 may transmit the PDN connection completion notification to the MME 40 based on the reception of the direct transfer message (S1724).

As stated above, the UE 10 may notify the MME 40 that the establishment of the direct communication path is completed by transmitting the direct transfer message and the PDN connection completion notification.

The RRC reconfiguration completion notification and the bearer configuration response may not be transmitted. For example, the UE 10 may determine to perform the transmission when the PDN connection between PGW 30 and the UE 10 of the related art is established, but may determine not to transmit when the direct communication path is established.

When the PDN connection between the PGW 30 and the UE 10 of the related art is established, the MME 40 performs the procedure with respect to the SGW 35 and the PGW 30 after the bearer configuration response or the PDN connection completion notification is received, and updates the bearer configuration.

Specifically, the MME 40 transmits a bearer update request to the SGW 35 (S1726), and the SGW 35 transmits the bearer update request to the PGW 30 based on the reception (S1728). The PGW 30 transmits a bearer update response to the SGW 35 as a response (S1730), and the SGW 35 transmits the bearer update response to the MME 40 based on the reception (S1732). Through the above procedure, bearer information is updated in each device.

Here, the MME 40 may not transmit the bearer update request by determining to perform the transmission when the PDN connection between the PGW 30 and the UE 10 of the related art is established or not to perform the transmission when the direct communication path is established. As mentioned above, the MME 40, the SGW 35 and the PGW 30 may not perform the update process of the bearer information when the direct communication path is established.

Through the above procedure, the UE 10 can discover the UE 10*a*. The UE 10 can start the direct communication of the LTE(D) with the UE 10*a* by discovering the UE 10*a*.

Although it has been described in the present example that the UE 10 transmits the PDN connectivity request when the UE 10 starts the communication with the UE 10*a*, the present embodiment is not limited thereto, but the PDN connectivity request may be previously transmitted.

For example, the UE 10 obtains the permission based on the fact that the PDN connectivity request for the establishment of the communication path of the LTE(D) is previously transmitted when the terminal is started or the application is started, the UE 10 may immediately establish the direct communication path when it is determined to start the communication with the UE 10*a* (S1717).

Although it has been described in the above example that the communication path based on the LTE(D) in order to perform the communication through the APP 1 is established and the communication is started, the UE 10 can apply the aforementioned method to the communication through the APP 2 and the communication through the APP 3, as shown in (a) of FIG. 4.

For example, when the communication of the APP 2 is performed, the UE 10 requests the permission for the establishment of the communication path of the WLAN(D) by selecting the APN which permits the WLAN(D) and adding the selected APN to the PDN connectivity request.

The UE 10 receives whether or not the establishment of the communication path of the WLAN(D) is permitted, and establishes the direct communication path of the WLAN(D) when the communication path establishment is permitted.

When the MME 40 permits the establishment of the communication path based on the WLAN(D), information such as SSID for allowing the UE 10 and the UE 10*a* to perform the direct communication may be included.

When the communication of the APP 3 is performed, the PDN connectivity request including the APN which permits the LTE(D) and the WLAN(D) may be transmitted. Alternatively, after it is determined to use the LTE(D), the APN which permits only the LTE(D) may be selected, and the PDN connectivity request including the selected APN may be transmitted. Alternatively, after it is determined to use the WLAN(D), the APN which permits only the WLAN(D) may be selected, and the PDN connectivity request including the selected APN may be transmitted.

As stated above, the UE 10 performs the establishment procedure after the permission for the establishment of the direct communication path correlated with the application is requested to the mobile communication provider. The permission request is performed based on the information correlated with the direct communication path. Thus, for example, when there is a plurality of applications correlated with the LTE(D), the permission request may not be transmitted for each individual application.

For example, when the communication using the LTE(D) is permitted at the time of starting the communication of the APP 1, if the communication using the LTE(D) is performed by the application different from the APP 1, it is determined that the communication path establishment is already permitted, and the direct communication path may be established.

In order to perform the communication through the APP 3, the UE 10 may transmit the PDN connectivity request including the APN which permits the LTE(D) and the WLAN(D), and may establish the communication path with the UE by arbitrarily selecting the direct communication path of the LTE(D) or the direct communication path of the WLAN(D) when the establishment of the communication paths of both the LTE(D) and the WLAN(D) is permitted.

In the UE 10*a* as the communication partner, the permission procedure based on the PDN connectivity request described above in order to obtain the permission of the communication provider at the time of establishing the direct communication path.

Alternatively, the permission procedure based on the PDN connectivity request may be performed when the establishment of the direct communication path is requested from the UE 10. That is, the completion of the permission procedure of the UE 10*a* as the communication partner at the time of establishing the direct communication path between the UE 10 and the UE 10*a* may be one condition for establishing the direct communication path.

When data of the application is transmitted and received, the UE 10 performs the communication by selecting the direct communication path correlated with the application.

Here, the UE 10 may establish the communication path with the PGW 30 by using the APN 4 which does not permit the establishment of the direct communication path in the state in which the direct communication path is established using the APN such as the APN 1 which permits the establishment of the direct communication path.

In this case, the UE 10 may transmit and receive data by managing the application and the communication path in correlation with each other, specifying the application from transmission and reception data, and selecting the communication path correlated with the specified application.

Thus, the UE 10 can transmit and receive data of the application which performs the direct communication by selecting the direct communication path, and can transmit and receive data of the application which performs the communication via the core network by selecting the communication path connected to the PGW 30.

The UE 10 may retain a bearer ID of the established direct communication path, and a bearer ID of the communication path established with the PGW 30, and may manage the communication path in correlation with the bearer ID.

The application and the bearer ID may be managed in correlation with each other based on the correlation of the communication path with the application and the correlation of the communication path with the bearer ID.

The UE 10 may specify the application from the transmission and reception data based on the correlation of the application with the bearer ID, and may transmit and receive the data by selecting the bearer ID correlated with the specified application.

Thus, the UE 10 can transmit and receive data of the application which performs the direct communication by selecting the bearer ID correlated with the direct communication path, and can transmit and receive data of the application which performs the communication via the core network by selecting the bearer ID correlated with the communication path connected to the PGW 30.

The UE 10 may manage the communication path and the PDN connection in correlation with each other by establishing the PDN connection for performing the communication using the established direct communication path and establishing the PDN connection for performing the communication using the communication path established with the PGW 30.

The application and the PDN connection may be managed in correlation with each other based on the correlation of the communication path with the application and the correlation of the communication path with the PDN connection.

The UE 10 may specify the application from the transmission and reception data based on the correlation of the application with the PDN connection, and may transmit and receive the data by selecting the bearer ID correlated with the specified application.

Thus, the UE 10 can transmit and receive data of the application which performs the direct communication by selecting the PDN connection of the direct communication path, and can transmit and receive data of the application which performs the communication via the core network by selecting the PDN connection of the communication path connected to the PGW 30.

Here, application specifying means for specifying the application corresponding to the data transmitted and received when the data is transmitted and received may specify the application based on the application based on IP5 tuple information such as a transmission source address, a transmission destination address, a protocol number, a transmission source port number, and a transmission destination port number. The application may be specified based on the identification information such as an application ID.

[1.3.4.2 Communication Path Establishment Procedure 2]

A method different from the method described in Communication Path Establishment Procedure 1 of 1.3.4.1 will be described as the procedure of performing the proximity discovery on the UE capable of performing the direct communication and starting to transmit and receive the data through the direct communication.

In Communication Path Establishment Procedure 1 of 1.3.4.1, the procedure of requesting that the provider is to permit the establishment of the direct communication path of the UE is performed based on the UE requested PDN connectivity procedure. Meanwhile, in the present example, the procedure of requesting that the provider is to permit the establishment of the communication path of the UE is performed based on a service request procedure.

Figure 18:
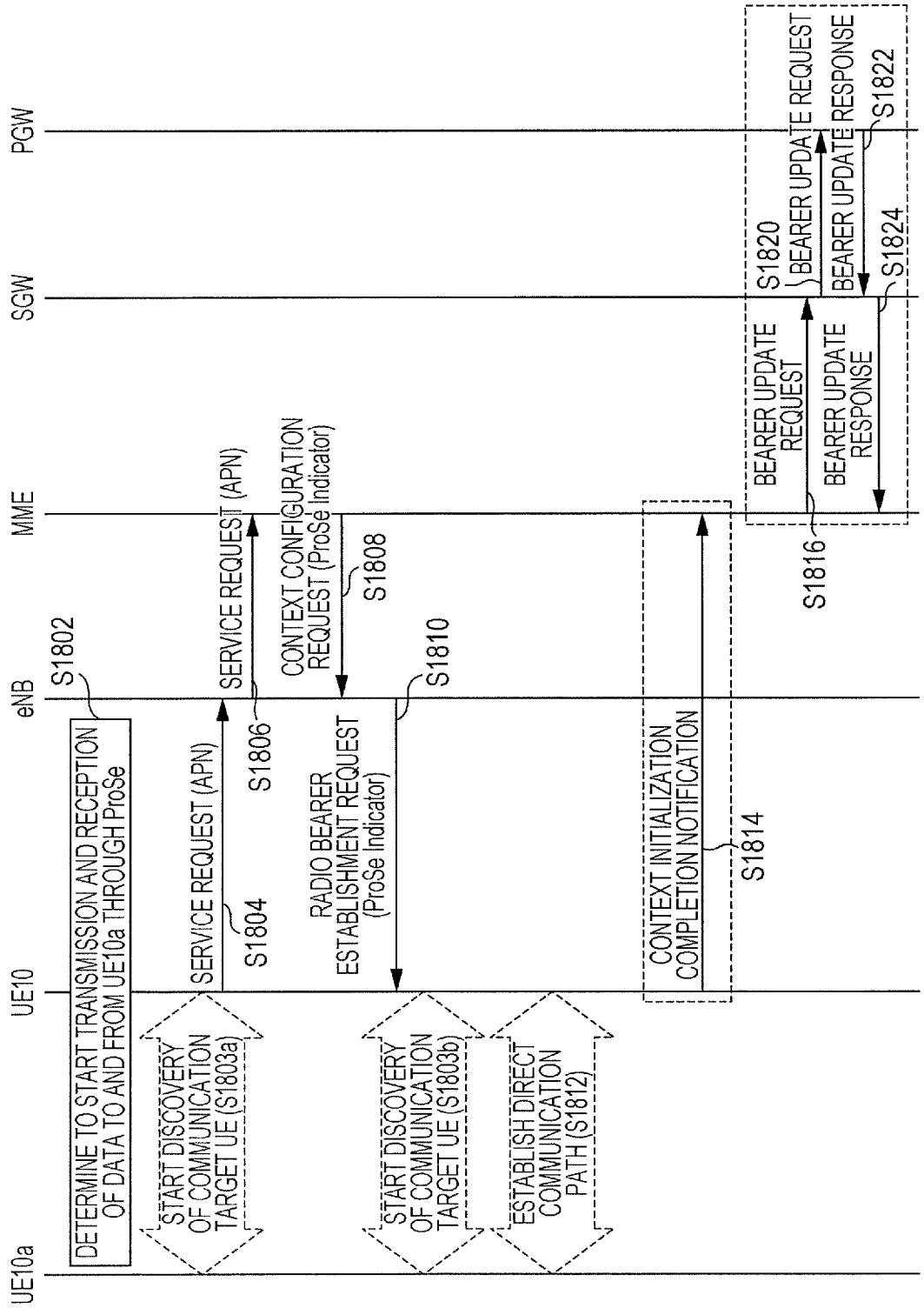
FIG. 18 is a diagram for describing a communication path establishment procedure based on a service request according to the first embodiment.

Communication Path Establishment Procedure 2 through the direct communication will be described with reference to FIG. 18. In the present example, the UE 10 detects the UE positioned in proximity enough to perform the communication using the APP 1 as described above. The information regarding the usable direct communication path is obtained.

In the present example, a procedure starting from a state in which the UE 10 detects the UE 10*a* as the UE positioned in proximity based on the notification from the ProSe Server 90 and detects that the usable communication path is the communication path based on the LTE(D) will be described.

Initially, the UE 10 determines to start transmitting and receiving data to and from the UE 10*c* through the ProSe (S1802). A specific determination method is the same as the method (S1702) in which the UE 10 determines to start transmitting and receiving data to and from the UE 10*c* through the ProSe in Communication Path Establishment Procedure 1 described with reference to FIG. 17, and thus, the description thereof will be omitted.

Before the communication path based on the LTE(D) with the UE 10*a* is established, the UE 10 may start the discovery of the communication target UE (S1803*a*). A specific method is the same method (S1702) of starting the discovery of the communication target UE in Communication Path Establishment Procedure 1 described with reference to FIG. 17, and thus, the description thereof will be omitted.

The UE 10 establishes the communication path based on the LTE(D) with the UE 10*a* based on the approval of the communication provider. As a method of requesting the approval of the communication provider, the service request may be transmitted to the eNB 45 based on the service request procedure of the UE (S1804). Here, the UE 10 transmits the service request by adding the APN to the service request.

In the procedure described herein, the service request may be transmitted in order for the UE 10 and the UE 10*a* to change from a connection standby state (idle) to a connected state.

The UE 10 that transmits the service request retains the APN correlated with the usable direct communication path, and when the usable direct communication path of the APP 1 is the LTE(D) and the UE 10 requests the approval for the establishment of the direct communication path of the LTE(D), the APN correlated with the LTE(D) is selected.

The APN managed in correlation with the direct communication path may be plural in number. For example, a plurality of different APNs such as an APN 1 correlated with the LTE(D), APN 2 correlated with the WLAN(D), and an APN 3 correlated with the plurality of direct communication paths such as the LTE(D) and the WLAN(D) may be managed.

This means that the APN is managed in correlation with permission information for the establishment of the direct communication path. For example, the APN is managed such that the LTE(D) is permitted in the APN 1, the WLAN(D) is permitted in the APN 2, and the LTE(D) and the WLAN(D) is permitted in the APN 3.

The UE 10 may retain an APN other than the APN which permits the establishment of the direct communication path, such as an APN 4 which does not permit the establishment of the direct communication path.

In order to request the permission for the establishment of the direct communication path of the LTE(D) to the MME 40, the UE 10 selects the APN which permits the LTE(D), among the plurality of APNs, and adds the selected APN to the PDN connectivity request.

Although it has been described in the above example that the UE 10 can select the APN 1 or the APN 3, the UE may manage the application in correlation with the APN such that the APN 1 is used for the APP 1, and may select the APN based on the correlation information. Alternatively, the APN may be arbitrarily selected.

In the discovery of the communication target UE, the resolution of the IP address of the UE 10*a* may be performed. In order to perform the resolution of the IP address, the IP address of the UE 10a may be simultaneously included when the UE 10 receives a response from the UE 10a.

When the service request is transmitted to the eNB 45 (S1804), the UE 10 adds the APN corresponding to the usable communication path of the UE 10a notified in the Server contact list 942 to the service request. Here, since the application that supports the direct communication of the LTE(D) is used, the UE 10 adds the APN 1 to the service request.

In any type of application, the WLAN(D) may be established. When both the LTE(D) and the WLAN(D) can be established, the UE 10 may arbitrarily determine any one of the LTE(D) and the WLAN(D), or may determine any one of the LTE(D) and the WLAN(D) by using the notification from the network.

The eNB 45 receives the service request from the UE 10, and transmits the service request including the APN to the MME 40 (S1806). Accordingly, the UE 10 transmits the service request to the MME 40 through the eNB 45.

Subsequently, the MME 40 receives the service request transmitted from the eNB 45, and checks the included APN. The checking of the APN is performed by determining that the received APN is the APN which permits the LTE(D) based on the permission information 442 for the establishment of the communication path. Thus, the MME 40 detects that the UE 10 requests the permission for the establishment of the direct communication path based on the LTE(D).

The MME 40 manages the APN that can be used for each UE, and determines whether or not the UE 10 can use the APN notified from the UE 10. When the UE 10 can use the APN, the MME 40 permits the establishment of the communication path correlated with the establishment of the direct communication path correlated with the APN, and does not permit the when the UE 10 is not able to use APN.

Through the above procedure, the MME 40 can determine to permit the establishment of the direct communication path based on the LTE(D) of the UE 10.

When the MME 40 determines as the permission, the MME 40 transmits a context configuration request to the eNB 45 (S1808), and the eNB 45 transmits a radio bearer establishment request to the UE 10 based on the context configuration request (S1810). Thus, the MME 40 notifies the UE 10 that it is determined that the establishment of the direct communication path based on the LTE(D) is permitted.

Here, the context configuration request and the radio bearer establishment request may include a flag, such as ProSe Indicator, which explicitly indicates that the establishment of the PDN connection between the PGW and the UE of the related art is not permitted and the establishment of the direct communication path is permitted.

The eNB 45 may determine whether or not to establish the wireless communication path for transmitting and receiving data with the UE 10 by including the ProSe Indicator.

For example, the eNB may detect that the establishment requested from the UE 10 is the direct communication path between the UEs, may not perform the establishment of the wireless communication path for transmitting and receiving the data including the allocation of the radio resource between the eNB 45 and the UE 10 based on the detection.

The eNB may detect that the establishment requested from the UE 10 is not the direct communication path between the UEs, and may establish the establishment of the wireless communication path including the allocation of the radio resource between the eNB 45 and the UE 10 based on the detection.

Subsequently, the UE 10 receives a radio bearer establishment request from the eNB 45, and detects that the establishment of the communication path based on the LTE(D) is permitted. The detection may be performed by detecting that the ProSe Indicator is included in the notification.

The MME 40 may notify the UE 10 of the context configuration request and the radio bearer establishment require by including information regarding a bearer ID or an IP address used by the UE 10 in order to perform the communication using the direct communication path or a frequency used for the direct communication.

Although it has been described that the discovery of the communication target UE is started before the service request is transmitted (S1703a), the discovery may be started after the radio bearer establishment request is received (S1803b).

The UE 10 receives the radio bearer establishment request, and establishes the direct communication path with the UE 10a when the establishment is permitted by the MME 40 (S1812). The UE 10 may not establish the direct communication path when the establishment is not permitted.

The UE 10 may determine whether or not to establish the direct communication path based on the communication path correlated with the APP and the direct communication path permitted by the MME 40. Alternatively, the UE 10 may determine whether or not to establish the direct communication path based on any one of the information regarding the communication path correlated with the APP and the direct communication path permitted by the MME 40.

For example, when the direct communication path correlated with the APP 1 is the LTE(D) and the APN permitted by the MME permits that the establishment of both the LTE(D) and the WLAN(D), since the LTE(D) is correlated with the APP 1 and the LTE(D) is permitted by the APN, the UE 10 determines to establish the direct communication path of the LTE(D).

In the establishment procedure of the direct communication path based on the LTE(D) with the UE 10a, the UE 10 may establish the communication path by using the frequency obtained from the RRC connection reconfiguration notification, or may establish the communication path by previously allocating a frequency to be used.

Here, the bearer ID or the IP address obtained from the RRC connection reconfiguration notification may be notified to the UE 10a, may be managed in correlation with the direct communication path, and may be used at the time of performing the direct communication.

At the time of establishing the direct communication path with the UE 10a, any one of the UE 10 and the UE 10a may allocate the IP address or the bearer ID and may notify the other one of the IP address or bearer ID, and the other one may obtain the notified IP address or bearer ID, may manage the obtained IP address or bearer ID in correlation with the direct communication path, and may use the IP address or bearer ID at the time of performing the direct communication.

As mentioned above, the UE 10 and the UE 10a can start the communication by establishing the direct communication path. When the communication path based on the LTE(D) is established for the communication of the APP 1, the UE 10 selects the direct communication path in order to transmit communication data of the APP 1, and transmits the communication data of the APP 1.

More specifically, at the time of transmitting user data of the APP 1, the correlated IP address may be selected, and the communication may be performed. The correlated bearer ID may be selected, the communication path may be specified, and the communication may be performed.

As for another application different from the APP 1, the communication is performed by establishing the connection with the PGW and selecting a communication path different from the direct communication path.

The UE 10 that completes the establishment of the communication path of the LTE(D) with the UE 10*a* may transmit a context initialization completion notification to the MME 40 (S1814).

The UE 10 may notify the MME 40 that the establishment of the direct communication path is completed by transmitting the context initialization completion notification.

The UE 10 may not transmit the context initialization completion notification. For example, the UE 10 may determine to perform the transmission when the PDN connection between the PGW and the UE of the related art, or may determine not to perform the transmission when the direct communication path is established.

When the PDN connection between the UE 10 and the PGW 30 of the related art is established, after the context initialization completion notification is received, the MME 40 performs the procedure between the SGW 35 and the PGW 30, and updates the bearer configuration.

Specifically, the MME 40 transmits a bearer update request to the SGW 35 (S1816), and the SGW 35 transmits the bearer update request to the PGW 30 based on the reception (S1820). The PGW 30 transmits a bearer update response to the SGW 35 (S1822), as a response, and the SGW 35 transmits the bearer update response to the MME 40 based on the reception (S1824). Through the above procedure, the bearer information is updated in each device.

Here, when the PDN connection between the PGW 30 and the UE 10 of the related art is established, the MME may determine to perform the transmission. Meanwhile, when the direct communication path is established, the MME may determine not to perform the transmission, and the MME 40 may not transmit the bearer update request. As stated above, when the direct communication path is established, the MME 40, the SGW 35, and the PGW 30 may not perform the update process of the bearer information.

Through the above procedure, the UE 10 can discover the UE 10*a*. The UE 10 can start the direct communication of the LTE(D) with the UE 10*a* by discovering the UE 10*a*.

Although it has been described in the present example that the transmission of the service request by the UE 10 is performed when the UE 10 starts the communication with the UE 10*a*, the present invention is not limited thereto, but the service request may be previously transmitted.

For example, the UE 10 may previously obtain permission based on the transmission of the service request for the establishment of the direct communication path of the LTE(D) at the time of starting the terminal or at the time of starting the application, and may immediately establish the direct communication path when the UE 10 determines to start the communication with the UE 10*a* (S1812).

Although it has been described in the above example that the communication is started by establishing the direct communication path based on the LTE(D) in order to perform the communication of the APP 1, the UE 10 can apply the aforementioned method to the communication of the APP 2 and the communication of the APP 3, as shown in (a) of FIG. 4.

For example, when the communication of the APP 2 is performed, the UE 10 requests the permission for the establishment of the communication path of the WLAN(D) by selecting the APN that permits the WLAN(D) and adding the selected APN to the PDN connection request.

The UE 10 receives whether or not the establishment of the communication path of the WLAN(D) is permitted, and establishes the direct communication path of the WLAN(D) when the establishment is permitted.

When the establishment of the communication path based on the WLAN(D) is permitted, the MME 40 may add information such as SSID for allowing the UE 10 and the UE 10*a* to perform the direct communication to the service request.

When the communication of the APP 3 is performed, the MME may transmit the PDN connection request by including the APN which permits the LTE(D) and the WLAN(D). After it is determined to use the LTE(D), the MME may transmit the PDN connection request by selecting the APN which permits the LTE(D). After it is determined to use the WLAN(D), the MME may transmit the PDN connection request by selecting the APN which permits only the WLAN (D).

As stated above, the UE 10 performs the establishment procedure after the permission of the mobile communication provider is obtained for the establishment of the direct communication path correlated with the application. The request for the permission is performed based on the information correlated with the direct communication path. Thus, for example, when there is a plurality of applications correlated with the LTE(D), the permission request may not be transmitted to the individual application.

For example, when the communication is permitted using the LTE(D) at the time of starting the communication of the APP 1, if an application different from the APP 1 performs the communication of the LTE(D), the direct communication path may be established by determining that the communication is already permitted.

In order to perform the communication through the APP 3, when the UE 10 transmits the service request including the APN which permits the LTE(D) and the WLAN(D) and the establishment of both the communication paths of the LTE(D) and the WLAN(D) is established, the UE may establish the direct communication path by arbitrarily selecting the direct communication path of the LTE(D) or the direct communication path of the WLAN(D).

The UE 10*a* as the communication partner may perform the permission procedure based on the service request described above in order to obtain the permission of the communication provider at the time of the establishment of the direct communication path.

Alternatively, the permission procedure may be performed based on the service request when the establishment of the direct communication path is obtained from the UE 10. That is, at the time of establishing the direct communication path the UE 10 and the UE 10*a*, the completion of the permission procedure of the UE 10*a* as the communication partner may be one condition for establishing the direct communication path.

As mentioned above, when data of the application is transmitted and received, the UE 10 performs the communication by selecting the direct communication path correlated with the application.

Here, the UE 10 may establish the communication path with the PGW 30 using the APN 4 which does not permit the establishment of the direct communication path in the state in which the direct communication path is established using the APN such as the APN 1 which permits the establishment of the direct communication path.

In this case, the UE 10 may transmit and receive data by managing the application and the communication path in correlation with each other, specifying the application from transmission and reception data, and selecting the communication path correlated with the specified application.

Thus, the UE 10 can transmit and receive data of the application which performs the direct communication by selecting the direct communication path, and can transmit and receive data of the application which performs the communication via the core network by selecting the communication path connected to the PGW 30.

The UE 10 may retain a bearer ID of the established direct communication path, and a bearer ID of the communication path established with the PGW 30, and may manage the communication path in correlation with the bearer ID. The application and the bearer ID may be managed in correlation with each other based on the correlation of the communication path with the application and the correlation of the communication path with the bearer ID.

The UE 10 may specify the application from the transmission and reception data based on the correlation of the application with the bearer ID, and may transmit and receive the data by selecting the bearer ID correlated with the specified application.

Thus, the UE 10 can transmit and receive data of the application which performs the direct communication by selecting the bearer ID correlated with the direct communication path, and can transmit and receive data of the application which performs the communication via the core network by selecting the bearer ID correlated with the communication path connected to the PGW 30.

The UE 10 may manage the communication path and the PDN connection in correlation with each other by establishing the PDN connection for performing the communication using the established direct communication path and establishing the PDN connection for performing the communication using the communication path established with the PGW 30. The application and the PDN connection may be managed in correlation with each other based on the correlation of the communication path with the application and the correlation of the communication path with the PDN connection.

The UE 10 may specify the application from the transmission and reception data based on the correlation of the application with the PDN connection, and may transmit and receive the data by selecting the bearer ID correlated with the specified application.

Thus, the UE 10 can transmit and receive data of the application which performs the direct communication by selecting the PDN connection of the direct communication path, and can transmit and receive data of the application which performs the communication via the core network by selecting the PDN connection of the communication path connected to the PGW 30.

Here, application specifying means for specifying the application corresponding to the data transmitted and received when the data is transmitted and received may specify the application based on the application based on IPS tuple information such as a transmission source address, a transmission destination address, a protocol number, a transmission source port number, and a transmission destination port number. The application may be specified based on the identification information such as an application ID.

1.3.5 Disconnection Procedure

In this section, a method of stopping transmitting and receiving data to and receive the UE 10*a* through the ProSe during the communication through the direct communication path between the UE 10 and the UE 10*a* will be described. Here, the UE 10 is not changed to the idle state from the connected state with the UE 10*a*, and is changed from the connected state to a disconnected state from the UE 10*a*.

Figure 19:
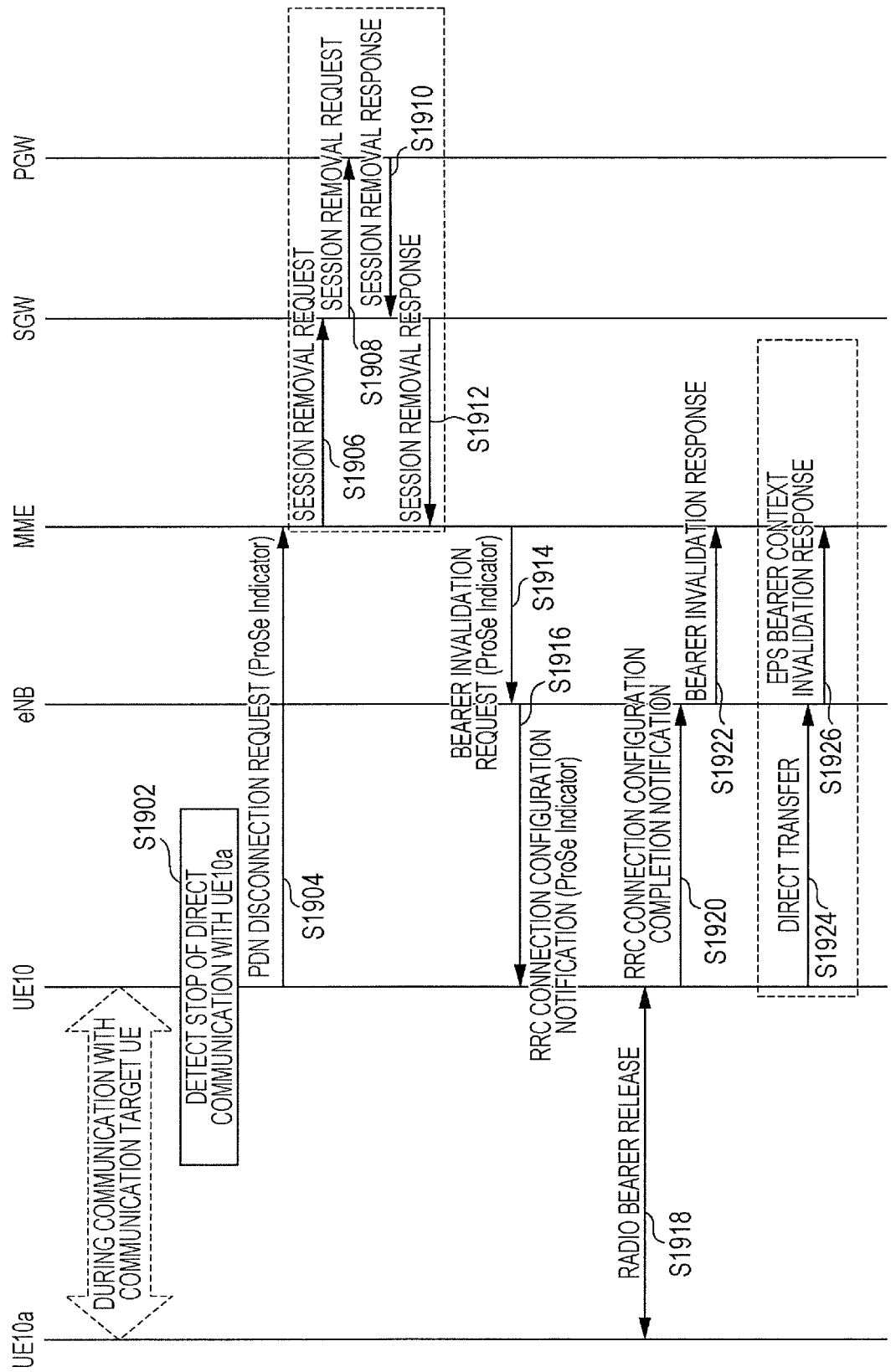
FIG. 19 is a diagram for describing a disconnection procedure of stopping direct communication according to the first embodiment.

The method of stopping the transmission and reception of data to and from the UE 10*a* through the ProSe will be described with reference to FIG. 19. In the following description, the procedure of stopping the direct communication is started by detecting that the UE 10 stops the direct communication. Meanwhile, the UE 10*a* can perform the same procedure.

Initially, the UE 10 detects the stopping of the direct communication with the UE 10*a* (S1902). Here, as the method of detecting the stopping of the direct communication, various methods are considered. For example, this detection may be performed when the transmission and reception of the data with respect to a direct communication partner is completed or when the distance between the UE 10 and the UE 10*a* increases and it is not able to maintain the direct communication.

Thereafter, the UE 10 that detects the direct communication with the UE 10*a* is stopped transmits a PDN disconnection request to the MME 40 (S1904). In this case, the UE may notify the PDN connection request including the ProSe Indicator.

The MME 40 may determine not to perform a procedure of removing the session executed in the SGW 35 and the PGW 30 based on the APN. The MME may detect that the PDN disconnection request is a request for establishing the direct communication path based on the ProSe Indicator, and may determine not to remove the session executed in the SGW 35 and the PGW 30.

When it is determined not to remove the session, a session removal request (S1906) transmitted to the SGW 35 from the MME 40, a session removal request (S1908) transmitted from the SGW 35 to the PGW 30, a session removal response (S1910) transmitted from the PGW 30 to the SGW 35, and a session removal response (S1912) transmitted from the SGW 35 to the MME 40 as responses thereof may not be received and transmitted.

As stated above, the MME 40 may select whether or not to remove the session within the core network, that is, to remove the communication path such as the PDN connection depending on the APN which grants the permission.

Thereafter, the MME 40 transmits a bearer invalidation request to the eNB 45 (S1914). In this case, a bearer ID indicating a bearer associated with the direct communication path may be included in the bearer invalidation request. A flag such as ProSe Indicator which explicitly indicates that the establishment of the PDN connection between the UE and the PGW of the related art is not permitted and the establishment of the direct communication path is permitted may be included in the bearer invalidation request.

The eNB 45 may determine to remove the wireless communication path with the UE 10 or release the resource by using the included ProSe Indicator.

For example, the eNB may detect that the removal requested from the UE 10 is the direct communication path between the UEs, and may not remove the wireless communication path including the release of the radio resource between the eNB 45 and the UE 10 based on the detection. The eNB may detect that the removal requested from the UE 10 is not the direct communication path between the UEs, and may remove the wireless communication path including the release of the radio resource between the eNB 45 and the UE 10 based on the detection.

Subsequently, the eNB 45 transmits the RRC connection reconfiguration notification for the UE 10 to the UE 10 (S1916). In this case, a bearer ID indicating a bearer associated with the direct communication may be included in the RRC connection reconfiguration notification. A flag such as ProSe Indicator which explicitly indicates that the direct communication path is removed in addition to indicating that the establishment of the PDN connection is permitted between the UE and the PGW in the related art may be included in the RRC connection reconfiguration notification.

Subsequently, the UE 10 releases the radio bearer with the UE 10a (S1918). In this case, the UE 10 may select whether or not to release the radio bearer based on the flag which explicitly indicates that the direct communication path or the bearer ID associated with the direct communication.

The UE 10 that releases the radio bearer with the UE 10a transmits the RRC connection reconfiguration completion notification to the MME 40 (S1920). The eNB 45 transmits the bearer invalidation response (S1922).

Thereafter, the UE 10 transmits the direct transfer message to the eNB 45 (S1924). The eNB 45 transmits an EPS bearer context invalidation response to the MME 40 based on the reception of the direct transfer message (S1926).

Whether or not to transmit the RRC connection reconfiguration completion notification by the UE 10 may be selected based on whether or not remove the direct communication path. Similarly, whether or not to transmit the direct transfer message by the UE 10 may be selected based on whether or not to remove the direct communication path.

For example, the UE 10 may determine to perform the transmission when the PDN connection between the PGW and the UE of the related art is removed, and may determine not to perform the transmission when the direct communication path is removed.

Through the above procedure, the UE can stop the direct communication with the communication target UE during the communication.

As discussed above, in the present embodiment, at the time of the discovery of the UE as the communication target, the UE as the communication source can detect whether or not the communication target UE is in proximity, can start the discovery of the communication target UE, and can suppress the waste of the power consumption.

When the UE starts the transmission and reception of data through the ProSe, even though the communication target UE is in the proximity of the communication source UE, if the communication source UE requests the transmission and reception of data through the LTE Direct and the communication target UE is not able to perform the transmission and reception of data through the LTE Direct, the communication source UE can suppress the power consumption by preventing unnecessary discovery from being started.

When the UE starts the transmission and reception of data through the ProSe, even though the communication target UE is in the proximity of the communication source UE, if the communication source UE requests the transmission and reception of data through the WLAN Direct and the communication target UE is not able to perform the transmission and reception of data through the WLAN Direct, the communication source UE can suppress the power consumption by preventing the unnecessary discovery from being started.

When the UE as the communication target is in proximity, the communication through the ProSe is started. When the UE as the communication target is not in proximity, even though the communication via a macro is started, it is possible to prevent the communication source UE from randomly discovering the communication target UE, it is possible to reduce the time necessary to detect that the UE as the communication target is not in proximity, and it is not able to cause the delay until the communication via a macro is started.

The UE can discover the UE as the communication target by configuring the condition for discovering the proximity, and can start the ProSe.

1.4 Modification Example

1.4.1 Modification Example 1

The UE according to the first embodiment manages the UE contact list 144 for each application, but may manage one UE contact list 144 for each UE without managing the UE contact list 144 for each application.

Figure 20:
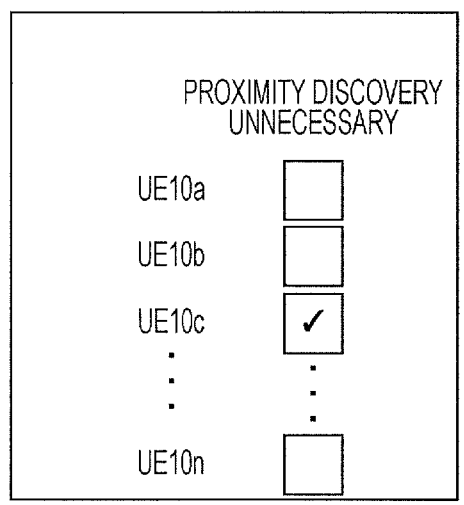
FIG. 20 is a diagram showing an example of a UE contact list managed in the UE.

FIG. 20 shows an example of the UE contact list 144 managed for each UE. As shown in FIG. 20, the UE 10 manages one UE contact list 144. Similarly to the first embodiment, the proximity discovery may not be performed using the proximity discovery unnecessary check box.

Since the UE 10 retains one UE contact list 144, the ProSe Server 90 manages the Server contact list 942 for each UE.

Figure 21:
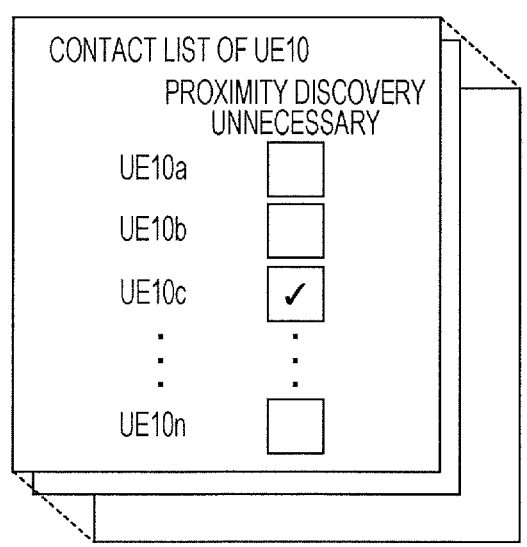
FIG. 21 is a diagram showing an example of a Server contact list managed in the ProSe Server.

FIG. 21 shows an example of the Server contact list 942 managed by the ProSe Server. As shown in FIG. 21, the ProSe Server 90 manages one Server contact list 942 for each UE.

The mobile communication system or the IP mobile communication network has the same configuration except for the above description. The UEs have the same configuration except for the UE contact list 144, and the ProSe Server 90 has the same configuration except for the Server contact list.

The UE positional information notification procedure, the proximity detection unnecessary notification procedure, the proximity detection procedure, the communication path establishment procedure, and the disconnection procedure can be similarly used, and thus, the description thereof will be omitted.

Thus, even when the UE 10 can use the plurality of applications, it is not necessary to have a different contact list for each application, and it is possible to share the same contact list by the plurality of applications.

1.4.2 Modification Example 2

Although it has been described that the UE 10 according to the first embodiment facilitates (turns ON) both the function of the LTE(D) and the function of the WLAN(D), the UE 10 may consider the ON or OFF of the function of the LTE(D) or the ON or OFF of the function of the WLAN(D).

The UE considers the ON or OFF of the function of the LTE(D) or the ON or OFF of the WLAN(D), and thus, the ProSe Server 90 can include the ON or OFF state of the LTE(D) or the ON or OFF state of the WLAN(D).

(a) of FIG. 22 shows an example of the ON or OFF of the LTE(D) in which the UE 10 manages the ON or OFF state of the LTE(D). In FIG. 22, the ON or OFF state of the LTE(D) is turned on.

(b) of FIG. 22 shows an example of the ON or OFF of the WLAN(D) in which the UE 10 manages the ON or OFF state of the WLAN(D). In FIG. 22, the ON or OFF state of the WLAN(D) is turned on.

FIG. 23 shows an example of the contact list of the Server contact list 942 in which the ON or OFF states of the LTE(D)

and the WLAN(D) are managed in the ProSe Server 90. Since the LTE(D) and the WLAN(D) are turned on in the UE 10, the ON or OFF states of the LTE(D) and the WLAN(D) are managed in the contact list of the UE 10.

Here, if the state of the LTE(D) is turned off in the UE 10, the state of the LTE(D) of the contact list of the UE 10 within the Server contact list 942 may be turned off, or the state of the LTE(D) may not be managed.

If the state of the WLAN(D) is turned off in the UE 10, the state of the WLAN(D) of the contact list of the UE 10 within the Server contact list 942 may be turned off, or the state of the WLAN(D) may not be managed. In the UE 10b, the state of the LTE(D) is turned on, the state of the WLAN(D) is turned off.

Figure 24:
FIG. 24 is a diagram showing a case where the LTE(D) availability and the WLAN(D) availability are updated in the Server contact list.

FIG. 24 shows an example in which the UE positional information of S1008 in "1.3.1 UE Positional Notification Procedure" is updated. Here, an updating example when UE 10b notifies the OFF state of the LTE(D) is illustrated. The LTE(D) of the UE 10b is changed from the ON state to the OFF state before the update and after the update.

Here, the ON or OFF state of the LTE(D) is changed. However, when the ON or OFF state of the WLAN(D) is notified from the UE, the ON or OFF state of the WLAN(D) may be changed, and when the ON or OFF state of the LTE(D) and the ON or Off state of the WLAN(D) are notified, the ON or OFF state of the LTE(D) and the ON or OFF of the WLAN(D) may be changed.

Not the UE positional information of S1008 in "1.3.1 UE Positional Notification Procedure" but the ON or OFF state of the LTE(D) and/or WLAN(D) may be updated using the proximity discovery unnecessary notifying process of S1208 in "1.3.2 Proximity Discovery Unnecessary Procedure".

The mobile communication system or the IP mobile communication network has the same configuration except for the above description. The UEs have the same configuration except for the ON or OFF state of the LTE(D) or the ON or OFF state of the WLAN(D), and the ProSe Server 90 has the same configuration except for the Server contact list.

The ProSe Server 90 detects the communication path that can be used at the time of detecting the proximity UE. However, when the state in which the UE invalidates the direct communication path establishment function such as the OFF state of the LTE(D) or the OFF state of the WLAN(D) is received and managed, the ProSe Server determines that these communication paths are not available.

The details of another UE positional information notification procedure, proximity detection unnecessary notification procedure, proximity detection procedure, communication path establishment procedure, and disconnection procedure are similarly applicable, and thus, the description thereof will be omitted.

1.4.3 Modification Example 3

In the first embodiment, the ProSe Server 90 indicates that the LTE(D) and the WLAN(D) can be used in the notification of the contact list of S1412. However, the ProSe Server 90 may notify the UE 10 of the proximity degree, and the UE 10 may determine to perform the direct communication depending on the proximity degree. The present modification example has a difference from the positional relationship between the UEs is expressed in numerical form and is notified and the granularity of the positional information can be minutely notified.

FIG. 25 shows an example of a UE action policy managed by the UE 10. As shown in FIG. 25, the WLAN(D) is performed in a case where the proximity degrees are 1 to 3, the LTE(D) is performed in a case where the proximity degree is 4, and it is not able to perform the direct communication in a case where the proximity degree is 5.

Only one proximity degree is not notified, and multiple proximity degrees are likely to be notified. When the proximity degree of 1 and the proximity degree of 4 are notified, there is a possibility that the WLAN(D) and the LTE(D) are arbitrarily selected.

FIG. 26 shows an example of the proximity evaluation policy 948 managed by the ProSe Server 90. The ProSe Server 90 evaluates the UE within the Server contact list 942 based on the positional information management table 946.

In FIG. 26, if the same AP name is managed in the positional relationship between the UEs, it is evaluated as being the proximity degree of 1, if the same SSID is managed, it is evaluated as being the proximity degree of 2, if the same Realm is managed, it is evaluated as being the proximity degree of 3, if the same eNB ID is managed, it is evaluated as being the proximity degree of 4, and when there is not any correspondence case, it is evaluated as being the proximity degree of 5.

FIG. 27 shows an example of the proximity evaluation result of S1410 of "1.3.3 Proximity Detection Procedure". Since the UE 10 are the UE 10a are managed to be connected to the same AP and are managed to be connected to the same eNB, the UE 10a is evaluated as the proximity degree of 1 and the proximity degree of 4.

Since the UE 10 and the UE 10b are managed to be connected to the same eNB, the UE 10b is evaluated as the proximity degree of 4. Since the positional information corresponding to the proximity evaluation policy 948 is not managed, the UEzz is evaluated as the proximity degree of 5.

The mobile communication system or the IP mobile communication network has the same configuration except for the above description. The UE has the same configuration except for the UE action policy, and the ProSe Server 90 has the same configuration except for the proximity evaluation policy 948.

The UE positional information notification procedure, the proximity detection unnecessary notification procedure, the proximity detection procedure, the communication path establishment procedure, and the disconnection procedure can be similarly used, and thus, the description thereof will be omitted.

1.4.4 Modification Example 4

Although it has been described in the first embodiment that the UE 10 establishes the communication path via the MME 40 or the eNB 45 which is the device of the mobile communication provider in order to establish the direct communication path, the UE 10 may establish the direct communication path by using the permitted direct communication path in the notification of the contact list from the ProSe Server 90.

The mobile communication system or the IP mobile communication network has the same configuration except for the above description. Since the UE positional information notification procedure, the proximity detection unnecessary notification procedure, and the proximity detection procedure can be similarly used, the description thereof will be omitted.

1.4.5 Modification Example 5

Figure 28:
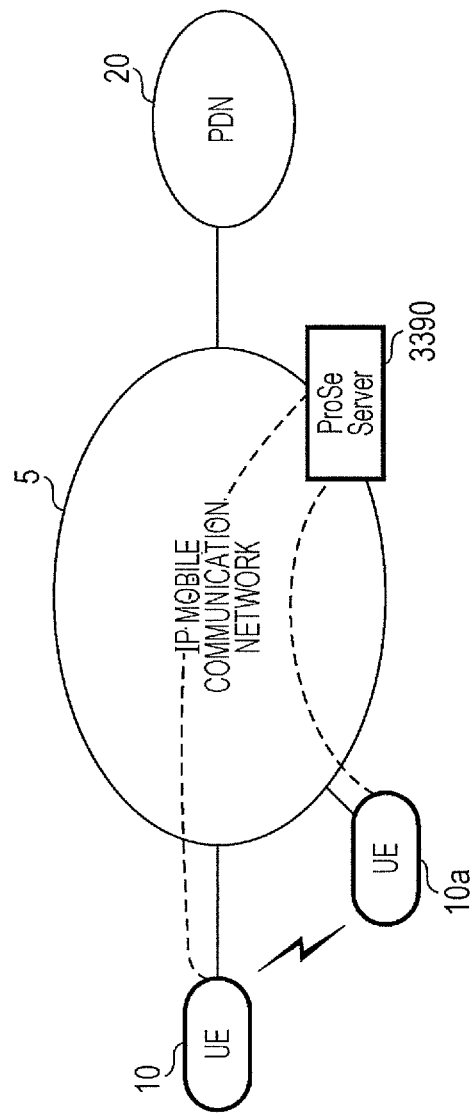
FIG. 28 is a diagram showing an example in which the ProSe Server is provided in the IP mobile communication network.

The mobile communication system may have the same configuration illustrated in FIG. 28 not the configuration illustrated in FIG. 1. It has been described in FIG. 1 that the ProSe Server 90 is provided on the PDN 20, but may be provided on the IP mobile communication network 5 as shown by a ProSe Server 3390 in FIG. 28.

The ProSe Server 3390 can perform the communication by ensuring a secure communication path with the UE 10 and the UE 10a. The ProSe Server 3390 can perform the communication by ensuring a secure communication path with the MME 40.

The mobile communication system or the IP mobile communication network has the same configuration except for the above description. The UE positional information notification procedure, the proximity detection unnecessary notification procedure, the proximity detection procedure, the communication path establishment procedure, and the disconnection procedure can be similarly used, and thus, the description thereof will be omitted.

1.4.6 Modification Example 6

Although it has been described in the first embodiment that when the UE 10 requests the permission for the establishment of the direct communication path from the mobile communication provider, the UE 10 transmits the request including the APN and the mobile communication provider determines whether or not to permit the request based on the APN, determination means is not limited thereto, but another method may be used.

For example, the MME 40 may manage an application list equivalent to the APP list 142 retained by the UE 10, may manage the application and the direct communication path capable of being established in correlation with each other, and may determine whether or not to permit the request based on the managed application list and direct communication path. In this case, the UE 10 may transmit the PDN connectivity request (S1704) or the service request (S1804) including the information regarding the application.

When the PDN connectivity request or the service request is received, the MME 40 may determine whether or not to permit the included application and the information of the direct communication path correlated with the application. Thus, the MME 40 can notify the UE 10 of whether or not to select the usable direct communication path and permit the establishment of the direct communication path for each application of the UE 10.

The configuration of each device and the procedure except for the above description are the same as those described in the first embodiment, and the detailed description thereof will be omitted.

As discussed above, although the first embodiment and the plurality of modification examples thereof have been described, the respective modification examples may be independently applied to the first embodiment, but may be applied by combining two or more modification examples.

1.4.7 Modification Example 7

Although the embodiments of the present invention have been described with reference to the drawings, a specific configuration is not limited to the embodiments. Designs within the scope without departing from the gist of the present invention are included in the claims.

In the respective embodiments, programs operated in the respective devices are programs (programs causing a computer to perform functions) that control a CPU and the like so as to realize the functions of the embodiments. The information used in these devices is temporarily accumulated in a temporary storage device (for example, RAM) during the process, and is then stored in a storage device such as various ROMs or HDDs. The stored information is read by the CPU when necessary, and is modified and written.

As a recording medium that stores the programs, any one of a semiconductor medium (for example, ROM, or non-volatile memory card), an optical recording medium and a magneto-optical recording medium (for example, DVD (Digital Versatile Disc), MO (Magneto Optical Disc), MD (Mini Disc), CD (Compact Disc), or BD), or a magnetic recording medium (for example, magnetic tape, or flexible disc) may be used.

The functions of the present invention may be realized by performing the process in cooperation with other application programs or an operating system based on the instruction of the program, in addition to realizing the functions of the embodiments by executing the loaded program.

When the programs are distributed on the market, the programs may be distributed by being stored in a portable recording medium, or may be transmitted to a server computer connected via a network such as the Internet. In this case, a storage device of a server computer may be included in the present invention.

In the embodiments, some or all of the respective devices may be realized using LSI (Large Scale Integration) which is an integrated circuit. The respective functional blocks of the respective devices may be realized as individual chips, or some or all thereof may be realized as an integral chip.

The integrated circuit is not limited to the LSI, but may be realized as a private circuit a general-purpose processor. As the semiconductor technology has progressed, when a technology for realizing the integrated circuit replaced with the LSI has appeared, it is possible to use integrated circuit realized by this technology.

Although it has been described in the embodiments that the LTE and the WLAN (for example, IEEE 802.11a/b/n) are used as the example of the wireless access network, the connection may be performed through the WiMAX in place of the WLAN.

INDUSTRIAL APPLICABILITY

The present invention is applicable to a cellular phone, a personal computer, and a tablet computer.

REFERENCE SIGNS LIST

1 Mobile communication system
5 IP mobile communication network
10 UE
20 PDN
30 PGW
35 SGW
40 MME
45 eNB
50 HSS
55 AAA
60 PCRF
65 ePDG
70 WLAN ANa
72 WLAN APa
74 GW
75 WLAN ANb
76 WLAN APb
80 LTE AN
90 ProSe Server

The invention claimed is:

1. A User Equipment (UE) comprising:
   transmitting and receiving circuitry configured to:
      intermittently transmit the UE's location information to a Proximity Services (ProSe) Server having a function of detecting that the UE and another UE are in proximity, and
      receive from the ProSe Server a first control information associated with a corresponding application ID among one or more application IDs; and
   a controller configured to detect that the another UE is in proximity with the UE, based on the first control information, wherein
      the transmitting and receiving circuitry is configured for receiving a plurality of control information respectively corresponding to each of the one or more application IDs in a procedure for detecting the another UE.

2. The UE according to claim 1, wherein the first control information includes information for WLAN direct communication with the another UE.

3. The UE according to claim 1, wherein the UE's location information is also managed by a device differing from the ProSe Server.

4. The UE according to claim 1, wherein the first control information includes identification information regarding the another UE.

5. The UE according to claim 1, wherein in a case that an indication for WLAN direct communication is included in the first control information, the UE uses the indication to engage in WLAN direct communication with the another UE.

6. A communication method performed by a User Equipment (UE), the communication method comprising:
   intermittently transmitting the UE's location information to a Proximity Services (ProSe) Server having a function of detecting that the UE and another UE are in proximity;
   receiving from the ProSe Server a first control information associated with a corresponding application ID among one or more application IDs; and
   detecting that the another UE is in proximity with the UE, based on the first control information, wherein
      the UE is configured for receiving a plurality of control information respectively corresponding to each of the one or more application IDs in a procedure for detecting the another UE.

7. The communication method according to claim 6, wherein the first control information includes information for WLAN direct communication with the another UE.

8. The communication method according to claim 6, wherein the UE's location information is also managed by a device differing from the ProSe Server.

9. The communication method according to claim 6, wherein the first control information includes identification information regarding the another UE.

10. The communication method according to claim 6, wherein in a case that an indication for WLAN direct communication is included in the first control information, the UE uses the indication to engage in WLAN direct communication with the another UE.

* * * * *